(12) United States Patent
Hirata et al.

(10) Patent No.: US 7,527,383 B2
(45) Date of Patent: May 5, 2009

(54) INFORMATION PROCESSING SYSTEM, INFORMATION PROCESSING APPARATUS, AND INFORMATION PROCESSING METHOD

(75) Inventors: Kazutaka Hirata, Kanagawa (JP); Tetsuo Iyoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 512 days.

(21) Appl. No.: 11/262,890

(22) Filed: Nov. 1, 2005

(65) Prior Publication Data
US 2006/0291014 A1 Dec. 28, 2006

(30) Foreign Application Priority Data
Jun. 28, 2005 (JP) .............................. 2005-189033

(51) Int. Cl.
G03B 21/00 (2006.01)
H04N 3/23 (2006.01)
G09G 5/00 (2006.01)

(52) U.S. Cl. ........................ 353/69; 348/746; 345/647
(58) Field of Classification Search .................. 353/69, 353/70; 248/745–747; 245/647
See application file for complete search history.

(56) References Cited

U.S. PATENT DOCUMENTS 6,755,537 B1 * 6/2004 Raskar et al. ................. 353/94
7,204,596 B2 * 4/2007 Tamura ........................ 353/70
2006/0132729 A1 * 6/2006 Engle .......................... 353/122

FOREIGN PATENT DOCUMENTS

| JP | 2004-265185 A | 9/2004 |
|----|---------------|--------|
| JP | 2005-6272 A | 1/2005 |
| JP | 2005-17350 A | 1/2005 |

OTHER PUBLICATIONS

Claudio Pinhanez, et al.; "Projector-camera Systems for Telepresence"; ETP '04; Oct. 15, 2004; pp. 63.

* cited by examiner

Primary Examiner—Rochelle-Ann J Blackman
(74) Attorney, Agent, or Firm—Sughrue Mion, PLLC

(57) ABSTRACT

An information processing system includes a projection unit that projects at least image data for calibration, an image data capturing unit that captures projection image data projected by the projection unit, a specifying unit that specifies positions of points to be calibrated with the image data captured by the image data capturing unit, the positions of the points to be calibrated representing a shape of the image data for calibration, a calculation unit that calculates parameters to transform the positions of the points to be calibrated on to the positions of reference points, and a transformation unit that transforms the image data captured by the image data capturing unit with the parameters.

25 Claims, 18 Drawing Sheets

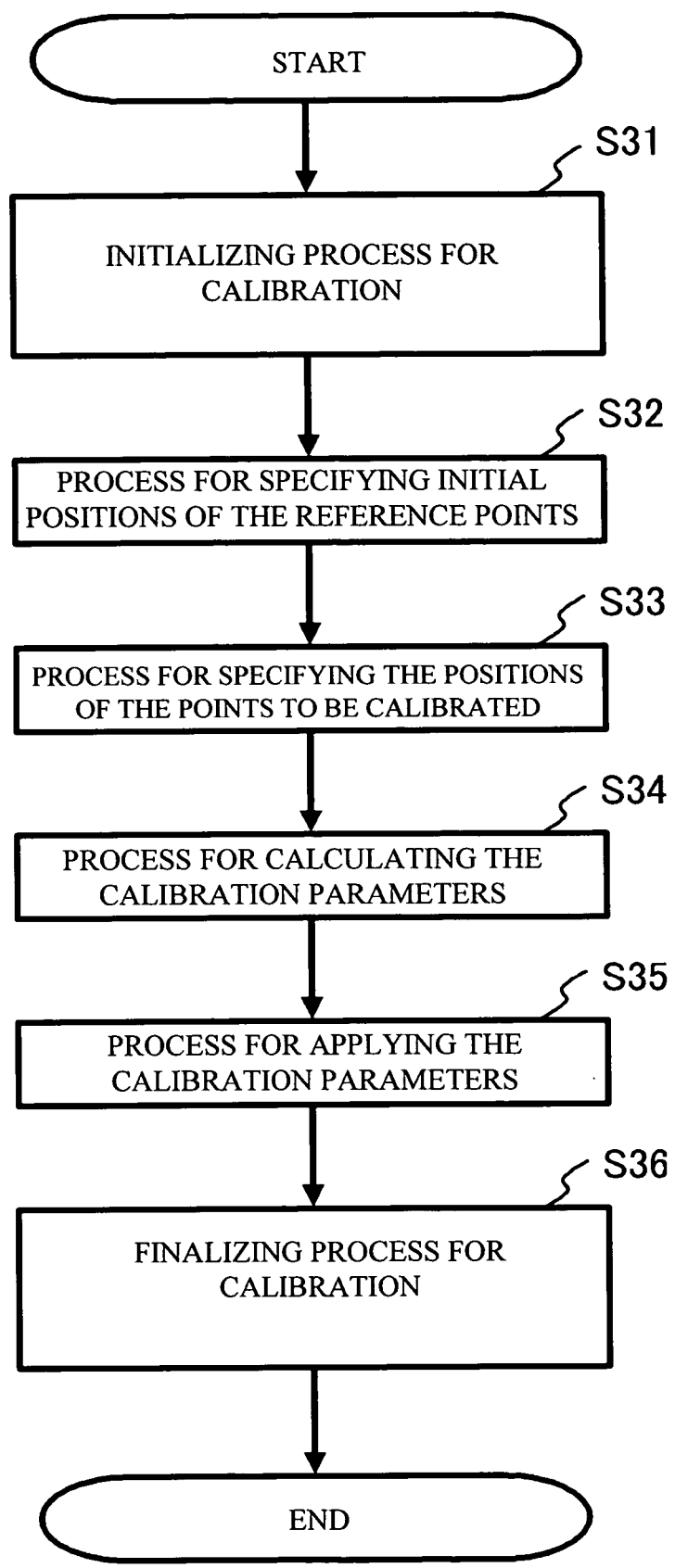

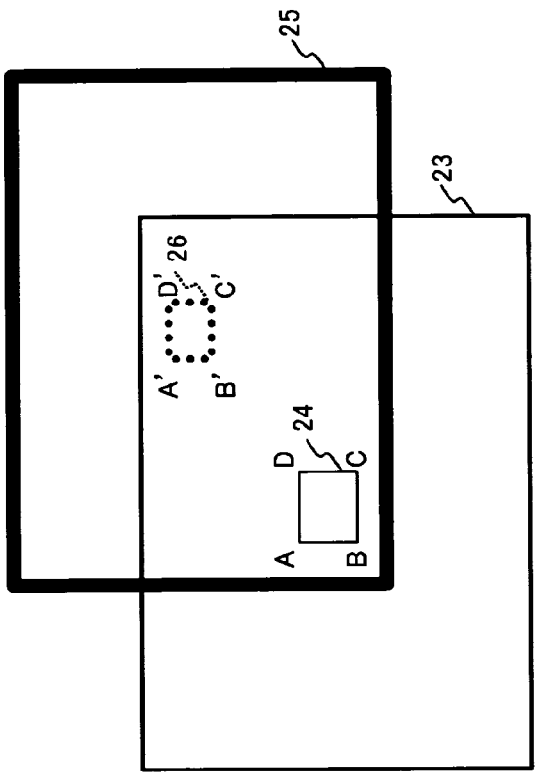
FIG. 8A
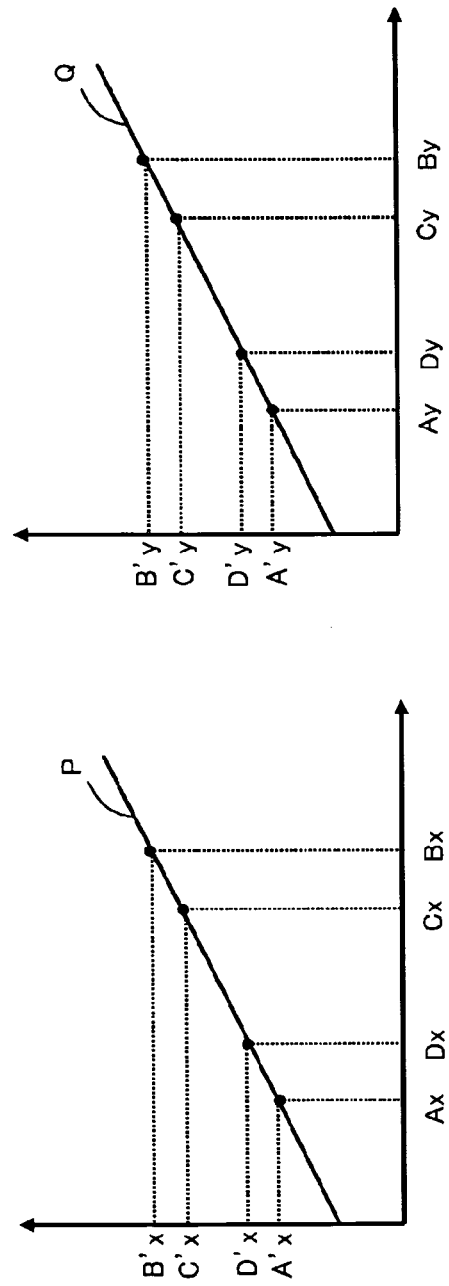
FIG. 8B
FIG. 8C

FIG. 9

```
<calibration-data>
<x>
0.0
</x>
<y>
0.0
</y>
<xScale>
1.0
</xScale>
<yScale>
1.0
</yScale>
</calibration-data>
```

IMAGE FOR CALIBRATION FORMED
OF FOUR IDENTICAL SQUARES

IMAGE FOR CALIBRATION FORMED OF
A HEXAGON HAVING SIX TRIANGLES

107 COLOR WHEEL

TIME SLOTS

INFORMATION PROCESSING SYSTEM, INFORMATION PROCESSING APPARATUS, AND INFORMATION PROCESSING METHOD

BACKGROUND OF THE INVENTION

1. Field of the Invention

This invention relates to information processing systems, information processing apparatuses, information processing methods, and computer programs.

2. Description of the Related Art

With the progress of today's communication technology, device technology such as cameras or projectors, and computing technology, computers, cameras, and projectors are widely spreading in working places. In combination with these technologies, communication systems and computer systems are capable of supporting various types of business activities performed at remote places. For instance, teleconferencing, videotelephony, and video chatting are frequently carried out in industrial activities and in a variety of everyday life. The network system, computer, camera, and projector installed on a meeting room can support the operation of remote teleconferencing.

Videoconferencing is a representative example of remote teleconferencing support systems. On the videoconferencing, image and sound input devices such as cameras and microphones and image and sound output devices such as monitors and speakers are installed in multiple conference rooms located at remote sites. The videoconferencing supports and promotes the communication between the remote sites.

With the videoconferencing system, various types of materials related to the conference, namely, whiteboards to be used for the conference, slides, and other presentation documents may be shared and stored in the conference rooms or personal desktop computers. For example, NetMeeting of Microsoft is known as typical desktop conferencing software. Users in the remotes sites, who are communicating over NetMeeting, are able to share conference materials of PowerPoint file and graphic data created with the drawing function.

In addition, the graphic data can be shared in real time by connecting electric blackboards or whiteboards to the network. For example, with SMARTBoard of SMART Technologies Inc., it is possible to display and share a handwritten drawing in the remote sites by utilizing a large-sized screen and a touch panel. Here, with the above-mentioned technologies, basically, only electronically-stored original data can be displayed and shared. However, while an actual conference is being held, there is a demand that the image data of a real thing existent in a three-dimensional space and the electric data are superimposed and displayed to share such superimposed image data.

There have been several proposals for the technique of superimposing the real thing (object) and the electric data for displaying such superimposed image data. For example, iLight system, having been developed by FXPAL (Fuji Xerox Palo Alto Laboratory), employs a projector and a camera and builds a server/client system. With the iLight system, users are able to display and share the graphic data at remote sites, for example, as described in Jonathan Foote and Don Kimber: "Remote Interactive Graffiti", MM'04, Oct. 10-16, 2004 (hereinafter, simply referred to as Document 1).

Specifically, in the iLight system, graphic data drawn by a drawing client at a remote location is superimposed and projected on real-world objects such as a whiteboard, poster, and sticky note with a video projector provided, and the image data projected on the real-world objects is captured with the camera provided at the server's end. Then, the image data captured can be displayed on the drawing client provided at the remote location.

In addition, IBM T. J. Watson Research Center proposed the projector camera system as described in Claudio Pinhanez and Gopal Pingali: "Projector-camera Systems for Telepresence", ETP'04, Oct. 15, 2004 (hereinafter, simply referred to as Document 2). In this system, the projector and camera are used together as in the iLight system, making it possible to project the graphic data drawn at the remote site on the real-word objects on site or on another local site with the projector. Furthermore, as in the iLight system, the graphic data and the real-world objects can be captured with the camera system, and such captured data can be sent to the remote site.

Additionally, there has been proposed a projector having a slant angle measuring device, as described in Japanese Patent Application Publication No. 2005-006272 (hereinafter, referred to as Document 3). The slant angle measuring device measures the slant angles in the vertical and horizontal directions relative to a light axis of the projector so as to correct the image distortion. There has also been proposed another projector, as described in Japanese Patent Application Publication No. 2005-017350 (hereinafter, referred to as Document 4). This projector suppresses the reduction in brightness of visible lights, displays the test pattern with the visible lights on the screen during the normal projection, measures the slant angles in the vertical and horizontal directions relative to the light axis of the projector, and adjusts the focus automatically.

Also, there has been proposed a projection device having a desktop camera and digitizer, as described in Japanese Patent Application Publication No. 2004-265185 (hereinafter, referred to as Document 4). This projection device processes the graphic data of paper data or material for reference as electronic data on the remote meeting or electronic conference.

Document 1, however, in the system that the projection image data projected by the projector is captured with the camera and sent to a remote location, in cases which the projector and camera are structurally or physically separated, there is a problem in that it is difficult to adjust the projector and camera correctly. For example, there are problems in that the relative positions of the image data projected by the projector and the image data captured by the camera are misaligned due to the difference in the light axes of the projector and camera, the difference in the angle of field, or the problem in the mechanical arrangement, the difference in the image size, and the problem caused by the distortion due to scaling up or down or the distortion due to parallel displacement and rotation. If the afore-mentioned problems are not corrected, there will cause another problem that the both of image data cannot be sent or received between the remote sites precisely. Also, the misalignment of the projector and the camera relative to the image data can be adjusted manually from the remote site, yet there is still another problem that it takes time and efforts to adjust the misalignment.

With respect to Document 3 through 5, the techniques described in Document 3 through 5 do not intend to control between the projector and camera.

SUMMARY OF THE INVENTION

The present invention has been made in view of the above circumstances and provides an information processing system, information processing apparatus, and information processing method in which light axes and field angles on a projection unit and an image data capturing unit can be calibrated automatically.

According to one aspect of the present invention, there may be provided an information processing system including a projection unit that projects at least image data for calibration; an image data capturing unit that captures projection image data projected by the projection unit; a specifying unit that specifies positions of points to be calibrated with the image data captured by the image data capturing unit, the positions of the points to be calibrated representing a shape of the image data for calibration; a calculation unit that calculates parameters to transform the positions of the points to be calibrated on to the positions of reference points; and a transformation unit that transforms the image data captured by the image data capturing unit with the parameters.

According to the present invention, the captured image data is transformed with the parameters used for transforming the positions of the points to be calibrated on to the positions of given reference points. It is therefore possible to automatically calibrate the misalignment of the projection area and the captured area caused resulting from the misalignment in the axes or field angles of the projection unit and the image data capturing unit, or the distortion due to simple scaling such as enlargement or reduction or the problem due to the parallel motion. This makes it possible to project the image data with the projection unit on arbitrary position expected by the user. A simple configuration of automatic calibration enables apparatus to be small-sized.

According to another aspect of the present invention, there may be provided an information processing apparatus including a specifying unit that specifies positions of points to be calibrated with image data projected by a projection unit and captured by an image data capturing unit, the positions of the points to be calibrated representing a shape of the image data for calibration; a calculation unit that calculates parameters to transform the positions of the points to be calibrated on to the positions of reference points; and a transformation unit that transforms the image data captured by the image data capturing unit with the parameters.

According to a further aspect of the present invention, there may be provided an information processing method including projecting at least image data for calibration; capturing projection image data projected by the projection unit; specifying positions of points to be calibrated with the image data captured by the image data capturing unit, the positions of the points to be calibrated representing a shape of the image data for calibration; calculating parameters to transform the positions of the points to be calibrated on to the positions of reference points; and transforming the image data captured by the image data capturing unit with the parameters.

According to a further aspect of the present invention, there may be provided a storage medium which is readable by a computer in order to execute a process of information processing on a computer and the function of the storage medium including capturing image data in which projection image data for calibration; specifying positions of points to be calibrated with the captured image data, the positions of the points to be calibrated representing a shape of the image data for calibration; calculating parameters to transform the positions of the points to be calibrated on to the positions of reference points; and transforming the captured image data with the parameters.

BRIEF DESCRIPTION OF THE DRAWINGS

Embodiments of the present invention will be described in detail based on the following figures, wherein:

FIG. 7 is a flowchart showing a calibration process implemented in step S4 in detail;

FIGS. 8A through 8C are views showing an example of the relationship between the projection area and a capture area in a calibration process;

FIG. 9 is a view showing a representation example of calibration parameters;

DESCRIPTION OF THE EMBODIMENTS

A description will now be given, with reference to the accompanying drawings, of embodiments of the present invention.

First Embodiment

Figure 1:
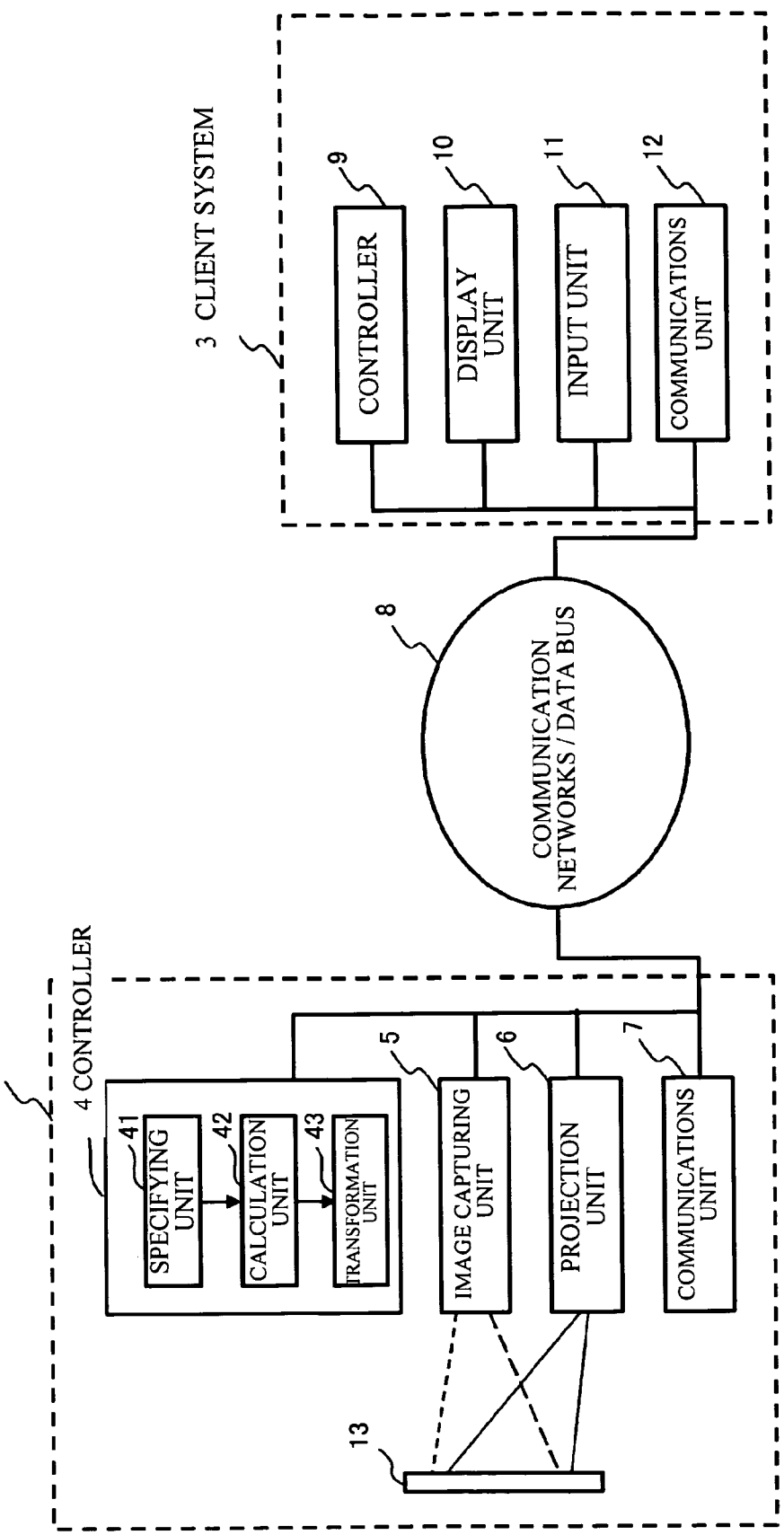
FIG. 1 schematically shows a functional configuration of a multimedia apparatus 1 in accordance with an embodiment of the present invention.

FIG. 1 schematically shows a functional configuration of a multimedia apparatus 1 in accordance with an embodiment of the present invention. Referring to FIG. 1, the multimedia apparatus (information processing system) 1 is composed a server system 2 and a client system 3. The server system 2 includes a controller (information processing device) 4, an image data capturing unit 5, a projection unit 6, and a communications unit 7; a transmitter device and a receiver device. The client system 3 includes a controller 9, a display unit 10, an input unit 11, and a communications unit 12. The server system 2 and the client system 3 are connected to each other via communication networks or a data bus 8.

The controller 4, the image data capturing unit 5, the projection unit 6, and the communications unit 7 are connected to one another via internal networks, data line, control line, or the like provided in the server system 2. In the same manner, the controller 9, the display unit 10, the input unit 11, and the communications unit 12 are connected to one another via the internal networks, data line, control line, or the like provided in the client system 3.

The image data capturing unit 5, composed of an image data capturing circuit having at least one lens and CCD, captures projection image data projected by the projection unit 6 either on a screen 13 or a real-world object (thing) to supply to the client system 3, and outputs such captured image data onto an internal memory of the controller 4. The projection unit 6, composed of at least one projector, projects the image data on a projection area on the screen 13, on the basis of the image data input from the communications unit 7 or the image data input from the controller 4. At this point, the projection unit 6 projects the image data (given image data) that the user expects to project with visible lights, and also projects image data for calibration with infrared lights. Preferably, the projection unit 6 projects the image data for calibration with a geometrical figure or figures in which a dot, line, triangle, or rectangle are combined.

The controller 4, composed of a CPU (Central Processing Unit), memory, either timer or clock, or the like, controls circuits and data in the image data capturing unit 5, the projection unit 6, and the communications unit 7. The controller 4 includes a specifying unit 41, a calculation unit 42, and a transformation unit 43. The specifying unit 41 specifies points to be calibrated, which show a shape of the image data for calibration, with the image data captured by the image data capturing unit 5. The calculation unit 42 calculates calibration parameters to transform the positions of calibrated points into the positions of given reference points. At this point, the calculation unit 42 calculates a slope and an intercept of a regression line in the regression analysis method, with the positions of the calibrated points and the positions of reference points, and further calculates the calibration parameters with the slope and intercept of the regression line. More specifically, the calculation unit 42 uses the positions of calibrated points and the positions of reference points to calculate the slope and intercept of the regression line in the regression analysis method, sets the intercept of the regression line at positional data or displacement data in a Cartesian coordinate system of the reference points, and then describes or expresses the calibration parameters in a structured document in which the slope of the regression line is set to scaling coefficients in the horizontal and vertical directions. The transformation unit 43 transforms the image data captured by the image data capturing unit 5 with the calibration parameters.

The parameter calculation on the calculation unit 42 and a calibration procedure with the parameters may be set up after the power is on. The calculation unit 42 may be configured to implement the process for calculating the calibration parameters and a calibration process with the parameters at a given timing or regularly at given intervals.

In accordance with an embodiment of the present invention, according to the operation, unless the use environment or an installation state of the external screen is changed, the above-mentioned calibration parameters are calculated and the calibration process is implemented only once after the power is on. After the calibration process, it is possible to project and capture with given image data in an appropriate state. In contrast, the calibration process may be implemented regularly at given intervals instead of calculating the calibration parameters and implementing the calibration process only once after the power is on. For example, in cases which a session denotes the period while the user is using the system having an embodiment of the present invention, the parameters may be calculated and the calibration process with the parameters may be implemented in every session. The parameters may be calculated and the calibration process with the parameters may be implemented at given intervals, for example, at five or ten minutes intervals in the session. In addition, according to the user's demand, the user may implement the calibration process simultaneously in real time (in the user's perception), while given image data is being projected and captured. In this case, technologically, physically, or procedurally, "the parameter calculation and calibration with the parameters" and "projection and capturing of given image data" may be repeated alternately at short intervals, namely, in real-time operations, for example, every 120 millisecond. A description will be given, later in detail, of a control method operated in a time slot specified at given time intervals.

The communications unit 7, composed of a network control circuit, communications control circuit, bus control circuit, or the like, inputs the image data from the internal memory on the controller 4, and outputs the image data to the projection unit 6. The communications unit 7 sends and receives the data with the communications unit 12 in the client system 3 via the communication networks or the data bus 8. The communications unit 7 sends the image data extracted by the image data capturing unit 5 to the client system 3, which is externally provided, via the communication networks or the databus 8. The controller 9, composed of a CPU, memory, or the like, controls the circuits and data in the display unit 10, the input unit 11, and the communications unit 12.

The display unit 10 is composed of a typical display or monitor, and displays to the user, the image data output from the communications unit 12 or the data output from the input unit 11. The input unit 11 outputs the data input by the user with a mouse or the like, to the display unit 10 or the communications unit 12. The communications unit 12 is composed of a network control circuit, communications control circuit, bus control circuit, or the like, and mainly inputs the image data from the input unit 11, and outputs the image data to the display unit 10. The communications unit 12 sends and receives the data with the communications unit 7 in the sever system 2 via the communication networks or the data bus 8.

Here, the server system 2 and the client system 3 configure so-called a feedback loop via the communication networks or the data bus 8. In other words, the projection unit 6 firstly projects the image data on the screen 13 on the basis of the image data input from the communications unit 7. Then, the image data capturing unit 5 captures the projection area on the projection unit 6, outputs the image data captured to the communications unit 7 via the internal memory on the controller 4. Subsequently, the communications unit 7 sends the image data captured by the image data capturing unit 5 to the internal memory on the controller 4 and the communications unit 12 in the client system 3 via the communication networks or the data bas 8.

The communications unit 12 receives the image data sent from the server system 2 via the communication networks or the data bus 8, and outputs the image data received to the controller 9. The controller 9 outputs the image data to the display unit 10, on the basis of the image data output from the communications unit 12. Thus, the user is able to view the image data captured by the image data capturing unit 5 in the server system 2, on the display unit 10. Accordingly, the user is able to input data such as annotation with the input unit 11, according to the image data displayed on the display unit 10. The data input on the input unit 11 is output to the controller 9.

The image data retained on the controller 9 is modified with the input data on the controller 9 by the input unit 11. The controller 9 outputs such modified image data to the communications unit 12. The communications unit 12 sends the image data input from the controller 9 to the communications unit 7 in the server system 2, via the communication networks or the data bus 8. The communications unit 7 outputs the image data received to the projection unit 6 via the communication networks or the data bus 8. The projection unit 6 projects the image data on the basis of the image data input from the communications unit 7.

If a real-world object is placed in front of the screen 13, the projection image data is superimposed on the real-world object. The projection image data being superimposed on the real-world object is captured by the image data capturing unit 5, as described above. In this manner, the server system 2 and the client system 3 configure the feedback loop via the communication networks or the data bas 8.

Figure 3:
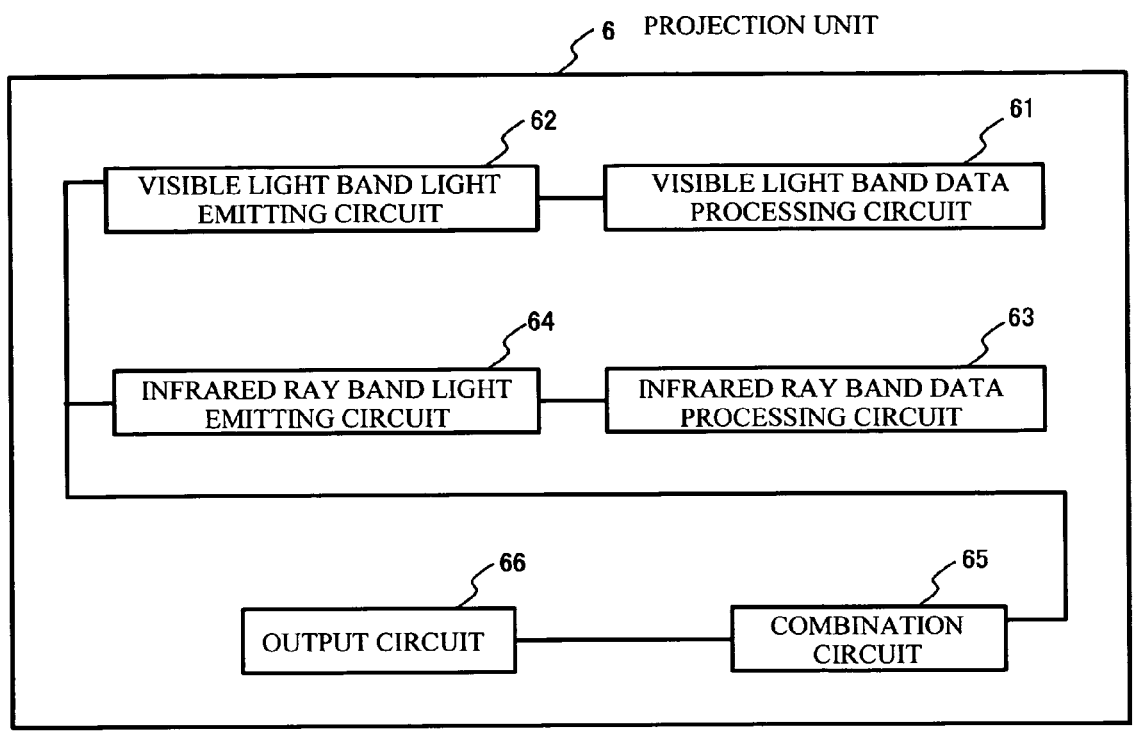
FIG. 3 is a block diagram showing a functional configuration of a projection unit in accordance with an embodiment of the present invention.

A description will now be given of the projection unit 6 in detail. FIG. 3 is a block diagram of a functional configuration of the projection unit 6 in accordance with the present embodiment of the present invention. As shown in FIG. 3, the projection unit 6 includes a visible light band data processing circuit 61, a visible light band light emitting circuit 62, an infrared ray band data processing circuit 63, an infrared ray band light emitting circuit 64, a combination circuit 65, and an output circuit 66. The visible light band data processing circuit 61 inputs the image data retained on the internal memory of the controller 4, and sends the image data on which a given process is implemented, to the visible light band light emitting circuit 62. The visible light band light emitting circuit 62 is composed of a light emitting circuit or element that corresponds to color components of R (Red), G (Green), and B (Blue) of the image data, and emits lights for projection on the basis of the image data output from the visible light band data processing circuit 61.

The infrared ray band data processing circuit 63 inputs the image data for calibration retained on the internal memory on the controller 4, and sends the image data, to the infrared ray band light emitting circuit 64. The image data for calibration is used for calculating the calibration parameters. The infrared ray band light emitting circuit 64 emits the infrared lights, on the basis of the image data for calibration output from the infrared ray band data processing circuit 63. The combination circuit 65 spatially combines the visible lights emitted from the visible light band light emitting circuit 62 and the infrared lights emitted from the infrared ray band light emitting circuit 64. The output circuit 66 projects the lights emitted from the combination circuit 65. In this manner, the image data for calibration is projected on the screen 13 or on a real-world object.

Figure 2:
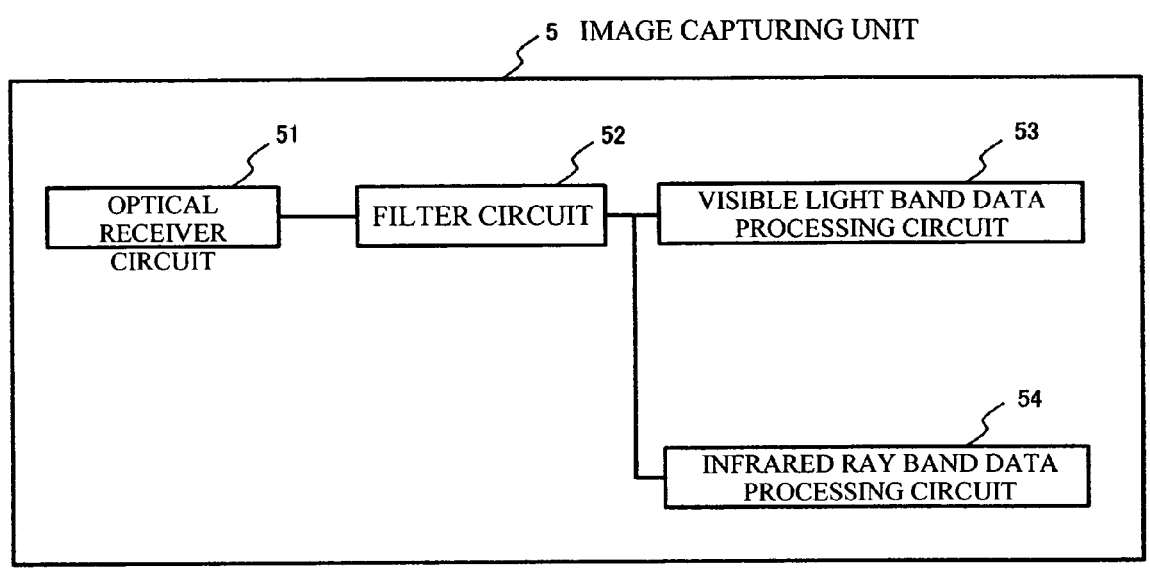
FIG. 2 is a block diagram showing a functional configuration of an image data capturing unit in accordance with an embodiment of the present invention.

Next, a description will be given of the image data capturing unit 5 in detail. FIG. 2 is a block diagram showing the functional configuration of the image data capturing unit 5 in accordance with the present embodiment of the present invention. Referring to FIG. 2, the image data capturing unit 5 includes an optical receiver circuit 51, a filter circuit 52, a visible light band data processing circuit 53, and an infrared ray band data processing circuit 54.

The optical receiver circuit 51 is composed of a lens or the like. The filter circuit 52 is composed of an infrared filter, for example, and separates the infrared lights from the visible lights. Specifically, the filter circuit 52 introduces the visible lights to the visible light band data processing circuit 53 and the infrared lights to the infrared ray band data processing circuit 54, from among the lights output from the optical receiver circuit 51. The filter circuit 52, serving as an extraction unit, is provided on the image data capturing unit 5 in accordance with the present embodiment of the present invention, yet may be provided outside the image data capturing unit 5.

The visible light band data processing circuit 53 is composed of a photoelectric conversion circuit, a memory, or the like, and photoelectrically converts the visible lights output from the filter circuit 52, creates the image data of the visible light band, and retains the image data of the visible light band in the internal memory. The visible light band data processing circuit 53 outputs the image data of the visible light band retained on the internal memory, to the internal memory on the controller 4, according to the control by the controller 4.

The infrared ray band data processing circuit 54 is composed of the photoelectric conversion circuit, a memory, or the like used in the infrared band, photoelectrically converts the infrared lights output from the filter circuit 52, creates the image data of the infrared light band, and retains the image data of the infrared light band on the internal memory. The infrared ray band data processing circuit 54 outputs the image data of the infrared ray band retained on the internal memory to the internal memory on the controller 4, according to the control by the controller 4.

Figure 4:
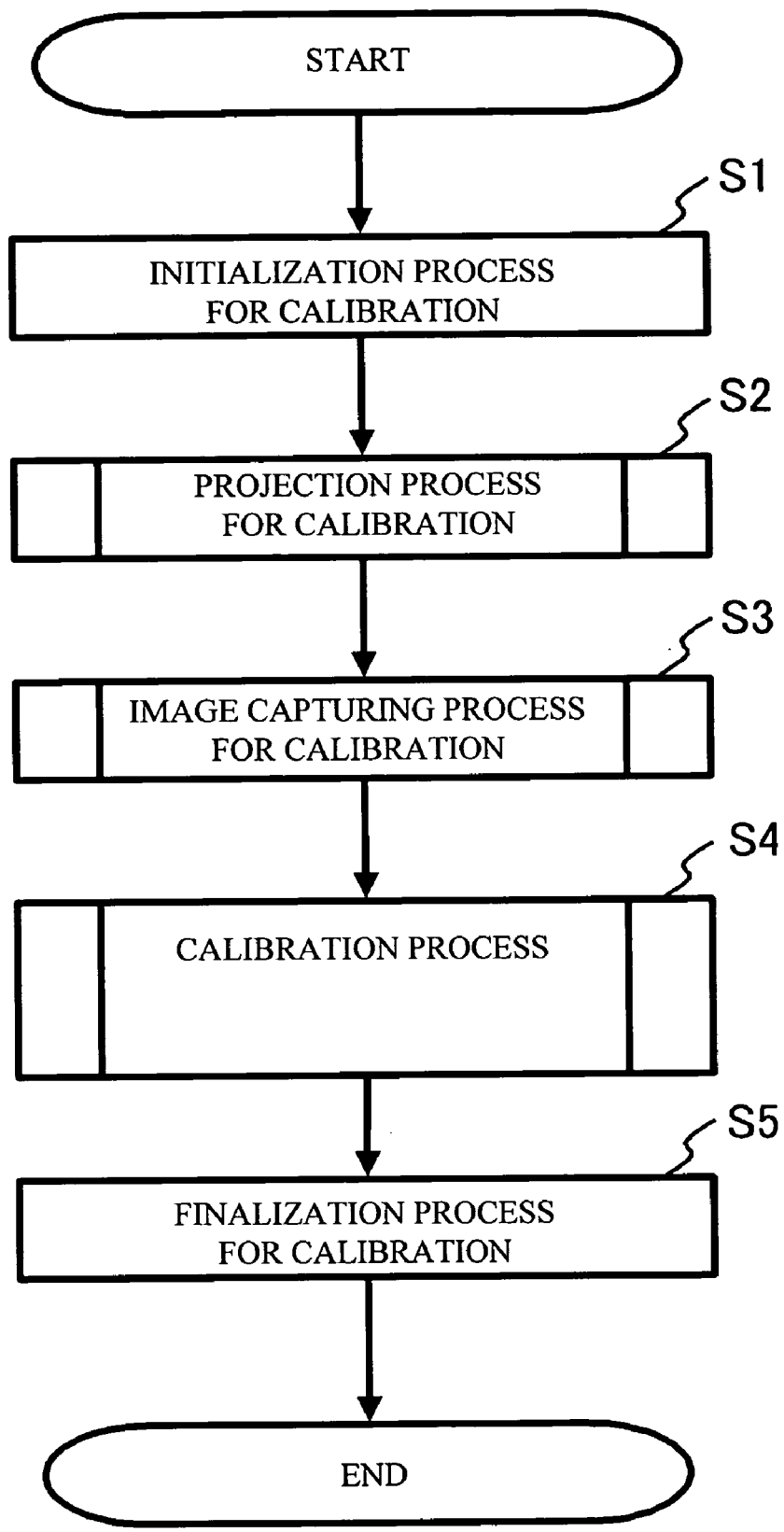
FIG. 4 is a flowchart showing a calibration process for calibrating positions in the in accordance with the present embodiment of the present invention.

FIG. 4 is a flowchart showing a calibration process for calibrating the positions in accordance with the present embodiment of the present invention. Here, calibrating the positions denotes the alignment of the projection image data projected by the projection unit 6 and captured image data captured by the image data capturing unit 5. Referring to FIG. 4, the process for calibrating the positions includes an initialization process for calibration (step S1), a projection process for calibration (step S2), an image data capturing process for calibration (step S3), a calibration process (step S4), and a finalization process for calibration (step S5).

Firstly, in step S1, the controller 4 initializes the internal memory of the controller 4, that is, assigns and clears the memory, and gives instructions for initialization to the image data capturing unit 5 and the projection unit 6. Next, in step S2, the projection unit 6 projects the image data for calibration with infrared lights. The process in step S2 will be described later in detail. In step S3, the image data capturing unit 5 separates the visible lights and infrared lights to extract the image data of the visible lights and the image data of the infrared lights for calibration. The process in step S3 will also be described later in detail. Here, the controller 4 is configured to be capable of performing data mapping, corresponding, associating, and transferring data between the internal memory of the controller 4 and the internal memory of the infrared ray band data processing circuit 54 on the image data capturing unit 5 and the internal memory of the infrared ray band data processing circuit 63 on the projection unit 6.

In step S4, the specifying unit 41 on the controller 4 specifies the positions of the points to be calibrated, which represents the shape of the image data for calibration, with the information of the captured image data captured by the image data capturing unit 5. The calculation unit 42 calculates the parameters to transform the positions of the points to be calibrated on to the positions of the given reference points. The transformation unit 43 transforms the captured image data captured by the image data capturing unit 5 with the parameters. Lastly, in step S5, the controller 4 implements a finalization process to clear the internal memory. Then, the communications unit 7 sends the captured image data transformed by the transformation unit 43 to the remote site. The communications unit 7 receives the image data to be projected by the projection unit 6 in the client system 3 at the remote site. The projection unit 6 projects the image data on the screen 13 or on the real-world object on the basis of the information received on the communications unit 7.

Figure 5:
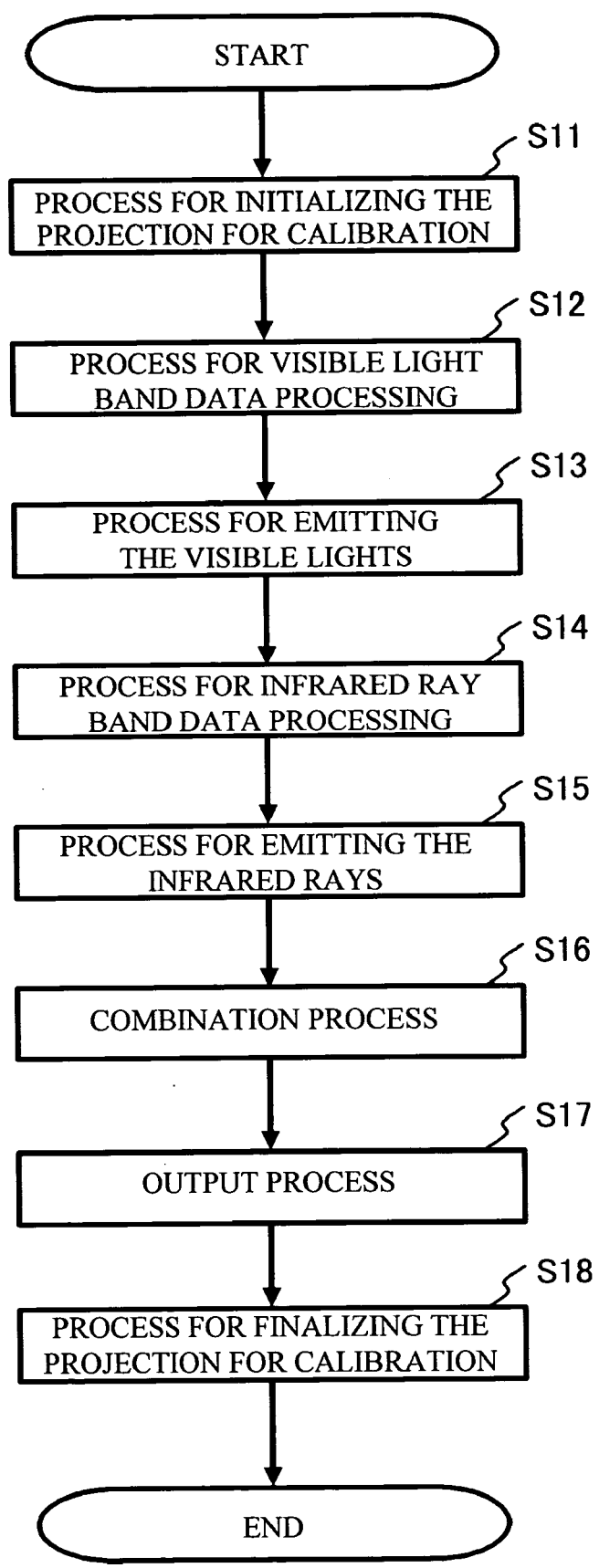
FIG. 5 is a flowchart showing a projection process for calibration implemented in step S2 in detail.

FIG. 5 is a flowchart showing a projection process for calibration implemented in step S2 in detail. As shown, the projection process for calibration implemented in step S2 includes a process for initializing the projection for calibration in step S11, a process for visible light band data processing in step S12, a process for emitting the visible lights in step S13, a process for infrared ray band data processing in step S14, a process for emitting the infrared rays in S15, a combination process in step S16, an output process in S17, and a process for finalizing the projection for calibration in step S18.

Firstly, in step S11, the projection unit 6 respectively initializes the visible light band data processing circuit 61, the visible light band light emitting circuit 62, the infrared ray band data processing circuit 63, the infrared ray band light emitting circuit 64, the combination circuit 65, and the output circuit 66. Specifically, the projection unit 6 assigns and resets the internal memories of the afore-mentioned respective units. Next, in step S12, the visible light band data processing circuit 61 inputs the image data to be projected with the visible lights from the internal memory on the controller 4, and implements a given process on the image data and sends the data to the visible light band light emitting circuit 62.

In step S13, the visible light band light emitting circuit 62 drives light emitting circuits respectively corresponding to the color components of R, G, and B, so as to emit the lights of the image data to be projected with the visible lights, according to intensity data of the color components. Subsequently, in step S14, the infrared ray band data processing circuit 63 inputs the image data for calibration to be projected with the infrared lights, from the internal memory on the controller 4, and implements a given process on the image data and sends the data to the infrared ray band light emitting circuit 64.

In step S15, the infrared ray band light emitting circuit 64 emits the infrared lights according to the intensity of the image data for calibration, or the spatial shape or pattern. In step S16, the combination circuit 65 spatially combines the visible lights emitted from the visible light band light emitting circuit 62 and the infrared rays emitted from the infrared ray band light emitting circuit 64. In step S17, the output circuit 66 emits the lights outwardly applied from the combination circuit 65. In step S18, the projection unit 6 finalizes the visible light band data processing circuit 61, the visible light band light emitting circuit 62, the infrared ray band data processing circuit 63, the infrared ray band light emitting circuit 64, the combination circuit 65, and the output circuit 66. Specifically, the projection unit 6 clears the internal memories of the afore-mentioned respective units.

Figure 6:
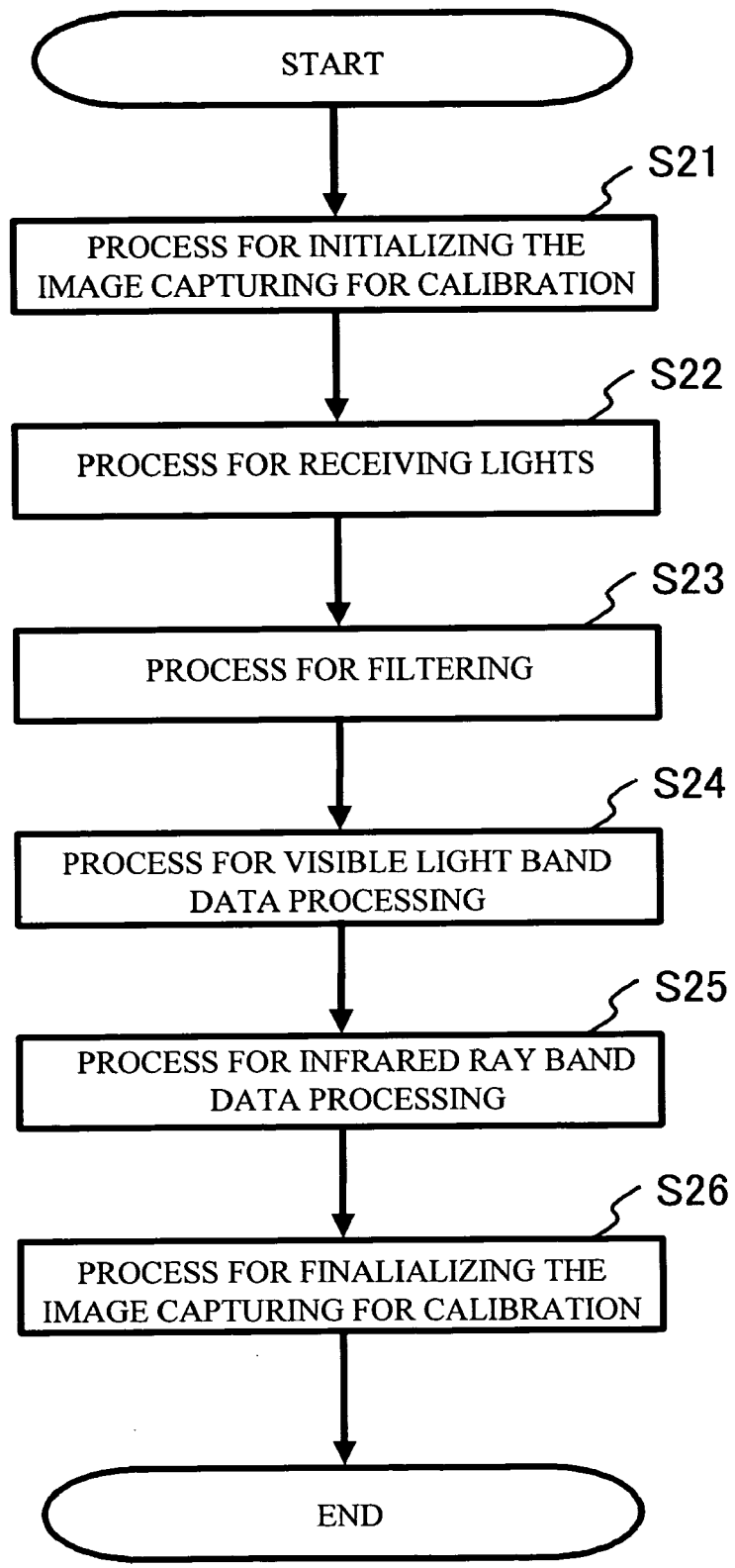
FIG. 6 is a flowchart showing an image data capturing process for calibration implemented in step S3 in detail.

FIG. 6 is a flowchart showing the image data capturing process for calibration implemented in step S3 in detail. As shown, the image data capturing process for calibration implemented in step S3 includes a process for initializing the image data capturing for calibration in step S21, a process for receiving lights in step S22, a process for filtering in step S23, a process for visible light band data processing in step S24, a process for infrared ray band data processing in step S25, and a process for finalizing the image data capturing for calibration in step S26.

Firstly, in step S21, the image data capturing unit 5 respectively initializes the optical receiver circuit 51, the filter circuit 52, the visible light band data processing circuit 53, and the infrared ray band data processing circuit 54. Specifically, the image data capturing unit 5 assigns and resets the internal memories of the afore-mentioned respective units. In step S22, the optical receiver circuit 51 receives the lights from the outside. In step S23, the filter circuit 52 separates the visible lights and the infrared lights from such input lights, and guides the visible lights to the visible light band data processing circuit 53 and the infrared lights to the infrared ray band data processing circuit 54.

In step S24, the visible light band data processing circuit 53 photoelectrically converts the visible lights applied from the filter circuit 52, extracts the image data projected with the visible lights, and outputs the image data to the internal memory on the controller 4. In step S25, the infrared ray band data processing circuit 54 photoelectrically converts the infrared lights applied from the filter circuit 52, obtains the image data for calibration projected with the infrared lights, and outputs the data to the internal memory of the controller 4. The controller 4 sends the image data projected with the visible lights to the client system 3 via the communications unit 7. This makes it possible to view the projection image data in the client system 3.

Lastly, in step S26, the image data capturing unit 5 respectively finalizes the optical receiver circuit 51, the filter circuit 52, the visible light band data processing circuit 53, and the infrared ray band data processing circuit 54. Specifically, the image data capturing unit 5 clears the internal memories of the afore-mentioned units.

FIGS. 8A through 8C are views showing examples of the relationship between the projection area and a capture area in the calibration process. FIG. 8A schematically shows image data drawn on the memory on the controller 4. A projection area 23 and a capture area 25 are not positioned appropriately yet, and are misaligned.

A rectangle of image data for calibration 24 has four vertexes A, B, C, and D. The image data for calibration 24 is projected by the projection unit 6 as the infrared lights. A rectangle of reference image data 26 in the capture area 25 has vertexes A', B', C', and D'. The controller 4 calculates the calibration parameters so that the vertexes A, B, C, and D of the image data for calibration 24 should conform to the vertexes A', B', C', and D' of the reference image data 26, which is ideal, and corrects the positions and shape of the image data for calibration 24. The shape of the reference image data 26 is represented by coordinates of the vertexes A', B', C', and D'. The coordinates of the vertexes A', B', C', and D' of the reference image data 26 can be represented as (A'x, A'y), (B'x, B'y), (C'x, C'y), and (D'x, D'y) respectively in either the Cartesian coordinate system of the image data capturing unit 5 or on the Cartesian coordinate system to represent the data on the memory of the controller 4. Reference points denotes the vertexes A', B', C', and D' of the reference image data 26, because the afore-mentioned vertexes serve as basis for calibration. The coordinates of the vertexes A, B, C, and D of the image data for calibration 24 can be represented as (Ax, Ay), (Bx, By), (Cx, Cy), and (Dx, Dy) respectively on the Cartesian coordinate system described above in FIGS. 8A through 8C. Here, points to be calibrated denote the vertexes A, B, C, and D of the image data for calibration 24.

A description will now be given of a calibration process. FIG. 7 is a flowchart showing the calibration process implemented in step S4 in detail. As shown in FIG. 7, the calibration process implemented in step S4 includes a process for initializing the calibration in step S31, a process for specifying initial positions of the reference points in step S32, a process for specifying the positions of the points to be calibrated in step S33, a process for calculating the calibration parameters in step S34, a process for applying the calibration parameters in step S35, and a process for finalizing the calibration in step S36. In step S4, the specifying unit 41 in the controller 4 specifies the positions of the points to be calibrated, which represents the shape of the image data for calibration 24 with the information of the captured image data captured by the image data capturing unit 5. The calculation unit 42 calculates the calibration parameters so as to transform the positions of the points to be calibrated into those of the reference points.

Firstly, in step S31, the controller 4 initializes the internal memory of the controller 4, that is to say, assigns and clears the memory. Then, in step S32, the specifying unit 41 refers to the graphic data from calibration output to the projection unit 6, and specifies the coordinates (A'x, A'y), (B'x, B'y), (C'x, C'y), and (D'x, D'y), which represent the shape of the reference image data 26. Here, the coordinates (A'x, A'y), (B'x, B'y), (C'x, C'y), and (D'x, D'y) of the reference points of the reference image data 26 can be specified when the reference image data 26 is created on the Cartesian coordinate system specified relative to the data on the internal memory on the controller 4. That is to say, any arbitrary coordinate may be specified. In addition, it is configured that the Cartesian coordinate system specified relative to the data on the internal memory on the controller 4 is identical to that specified relative to the data on the internal memory on the infrared ray band data processing circuit 54.

In some cases, depending on the initial positions of the reference points, the image data capturing unit 5 may not be capable of capturing all the coordinates of the shape of the image data for calibration 24. For example, there is a case where the initial positions of reference points B and C of the image data for calibration 24 are located outside of the capture area 25. In this case, in step S32, the controller 4 modifies the positions or the shape of the reference image data 26 so that all the coordinates of the vertexes representing the image data for calibration 24 may be located inside of the capture area 25.

In step S33, the specifying unit 41 refers to the data of the image data for calibration 24 input from the image data capturing unit 5, and specifies the positions of the points to be calibrated. Specifically, the specifying unit 41 respectively specifies the coordinates of the points to be calibrated A, B, C, and D of the image data for calibration 24 shown in FIG. 8. That is to say, the specifying unit 41 specifies (Ax, Ay), (Bx, By), (Cx, Cy), and (Dx, Dy) of the image data for calibration 24 on the Cartesian coordinate system in the image data capturing unit 5. The specifying unit 41 is capable of specifying the coordinates of (Ax, Ay), (Bx, By), (Cx, Cy), and (Dx, Dy) by applying the conventional image data processing technique.

Next, in step S34, the calculation unit 42 calculates the calibration parameters with the coordinate data of the reference points A', B', C', and D' and the coordinate data of the points to be calibrated A, B, C, and D. The calculation unit 42 calculates the relative displacement of the coordinates on the Cartesian coordinate system of the coordinates and relative scaling coefficients in the horizontal and vertical directions of the coordinates, namely, enlargement ratio or reduction ratio as the calibration parameters.

Accordingly, the calibration parameters are represented as the relative displacement of the coordinates on the Cartesian coordinate system and relative horizontal and vertical scaling coefficients of the coordinates, namely, a set of data of the enlargement ratio or reduction ratio. For example, the calibration parameters may be represented as XML (Extensible Markup Language), which is a structured document, as shown in FIG. 9. In FIG. 9, the calibration parameters are shown in XML format having a root element of calibration-data, and includes elements of x, y, xScale, and yScale. In FIG. 9, the x element has a value of 0.0, the y element has a value of 0.0, the xScale element has a value of 1.0, and the yScale element has a value of 1.0. Here, x denotes an x-coordinate of the relative displacement of the calibration parameters on the Cartesian coordinate system y denotes an y-coordinate of the relative displacement of the calibration parameters on the Cartesian coordinate system. xScale denotes the scaling coefficient of the relative horizontal direction of the calibration parameters on the Cartesian coordinate system yScale denotes the scaling coefficient of the relative vertical direction of the calibration parameters on the Cartesian coordinate system.

Specifically, the calculation unit 42 calculates the calibration parameters by applying the regression analysis method. Referring back to FIG. 8B, the calculation unit 42 calculates the x-coordinates of the reference points such as A'x, B'x, C'x, D'x, namely, the x-coordinates of the points to be calibrated of the image data for calibration 24. In other words, the calculation unit 42 calculates the slope, the intercept, which is represented as a constant term, in a first regression line P, with Ax, Bx, Cx, and Dx. Here, the slope denotes the relative scaling coefficient (xScale) of the horizontal direction with respect to a mapping of the initial positions of the reference points and the coordinates of the points to be calibrated of the image data for calibration 24. The intercept, which is represented as the constant term, denote the relative displacement (xOffset) of the horizontal direction with respect to the mapping of the initial positions of the reference points and the coordinates of the points to be calibrated of the image data for calibration 24.

The controller 4, referring back to FIG. 8C, calculates the y-coordinate of the reference points such as A'y, B'y, C'y, D'y, namely, the y-coordinates of the points to be calibrated of the image data for calibration 24. In other words, the calculation unit 42 calculates the slope and the intercept, which is also represented as a constant term, in a second regression line Q. Here, the slope denotes the relative scaling coefficient (yScale) of the vertical direction with respect a mapping of the initial positions of the reference points and the coordinates of the points to be calibrated of the image data for calibration 24. The intercept, which is represented as the constant term, denote the relative displacement (yOffset) of the vertical direction with respect to the mapping of the initial positions of the reference points and the coordinates of the points to be calibrated of the image data for calibration 24.

In the description above, the calibration parameters with the image data for calibration is calculated on the Cartesian coordinate system on the image data capturing unit 5, yet may be calculated on the Cartesian coordinate system on the projection unit 6. In the same manner, the calibration parameters may be calculated with an abstract coordinate system geometrically relating to the image data capturing unit 5 and the projection unit 6. In addition, the calculation with the calibration parameters has been exemplified in the regression analysis method, yet the calibration parameters may be calculated with a fitting function.

Next, in step S35, the transformation unit 43 implements an image data processing for transforming the coordinates with the calculated calibration parameters, and calibrates the captured image data.

$$\begin{pmatrix} x' \\ y' \end{pmatrix} = \begin{pmatrix} xScale & 0 \\ 0 & yScale \end{pmatrix} \begin{pmatrix} X \\ Y \end{pmatrix} + \begin{pmatrix} xOffset \\ yOffset \end{pmatrix}$$ [Expression 1]

Here, (X, Y) denotes the coordinates prior to transformation and (x', y') denotes the coordinates subsequent to transformation. XScale and yscale respectively denote the slopes of the regression lines P and Q, and xOffset and yOffset respectively denote the intercepts of the regression lines P and Q. Displaying the calibrated image data allows the user to view appropriately calibrated image data on a display with graphical user interface (GUI) or screen, which corresponds to the display unit 10 in the client system 3. Lastly, in step S36, the controller 4 implements the finalization process associated with the calculation and application of the calibrated data such as releasing the internal memory.

In the description above, the data of the captured image has been calibrated, with the coordinate data of the image for calibration, namely, the coordinate data to be calibrated, the coordinate data of the reference image data, namely, the slopes (xScale and yScale) and the intercepts (xOffset and yOffset) of the regression lines or regression expression to predict the calibrated coordinate data, namely, ideal coordinate data. However, on the contrary, it is possible to modify the image data prior to projection by implementing the image data processing of geometrical transformation on the image data to be projected, with the slopes and intercepts of the regression lines or regression expression to predict the coordinate data of the reference image data, namely, the calibrated or ideal coordinate data.

Additionally, the description has been given of a case where the distortion due to simple scaling such as enlargement or reduction or the problem due to the parallel motion is calibrated. However, the calculation unit 42 calculates the parameters (a, b, c, and d) in Expression 2 shown below used for the conformal transformation (Helmert transformation) in order to solve the problem caused by the distortion due to the rotation. Thus, the distortion due to scaling (enlargement or reduction) or the problem caused by the parallel motion or rotation distortion may be corrected. Furthermore, the projection distortion can be corrected by calculating parameters (a1, a2, a3, a4, a5, a6, a7, and a8) in a so-called two-dimensional projection transformation as Expression 3 shown below. Variables x and y in Expressions 2 and 3 respectively denote the coordinates of the reference points. Variables u and v respectively denote the coordinates of the points to be calibrated.

$$u = ax - by + c$$ [Expression 2]

$$v = bx + ay + d$$

$$u = \frac{a_1 x + a_2 y + a_3}{a_7 x + a_8 y + 1}$$ [Expression 3]

-continued $$v = \frac{a_4 x + a_5 y + a_6}{a_7 x + a_8 y + 1}$$

Generally, the parameters can be determined in the least squares method with at least the number of the coordinates of the reference points and the points to be calibrated, necessary for determining the afore-mentioned parameters.

In addition, it is easily to adopt the above calibration method and apply it for the additional data such as so-called annotations with the image data. Namely, in cases which annotation data is added to a captured image data, the annotation data may be calibrated by the above calibration processes. Therefore, this invention may be applied to the system which uses annotation like the iLight system in the Document 1.

Second Embodiment

Figure 10A:
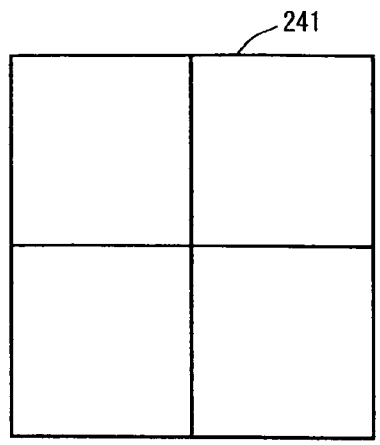
FIGS. 10A and 10B are views showing other examples of image data for calibration.
Figure 10B:
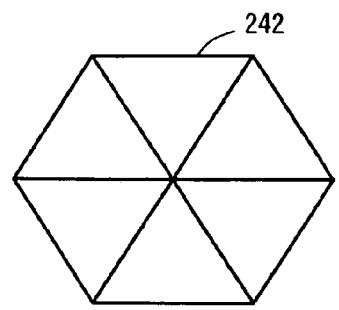

A description will now be given of a second embodiment of the present invention. In the first embodiment, the description has been given of a case where a shape of rectangle is employed for the image data for calibration. In the second embodiment, another image data for calibration will be exemplified. FIGS. 10A and 10B are views showing other examples of the image data for calibration. FIG. 10A shows image data for calibration 241 formed of four identical squares. FIG. 10B shows image data for calibration 242 formed of a hexagon having six triangles. The projection unit 6 projects the image data for calibration 241 formed of four identical squares and the image data for calibration 242 formed of a hexagon having six triangles, with the infrared lights. The image data capturing unit 5 captures the projection image data. The specifying unit 41 on the controller 4 specifies the points to be calibrated of the image data for calibration with the projection unit 6. The calculation unit 42 calculates the calibration parameters with the points to be calibrated and given reference points. The transformation unit 43 transforms the image data captured by the image data capturing unit 5, with the calibration parameters.

In the step S33, the specifying unit 41 applies the conventional image processing technique in order to specify the positions or the coordinates of the respective vertexes or intersection points of the image data for calibration 241 formed of four identical squares and the image data for calibration 242 formed of a hexagon having six triangles. That is to say, the specifying unit 41 implements a binary processing or thin line processing on the data of the image for calibration provided from the image data capturing unit 5, and specifies the positions or the coordinates of the respective vertexes or the intersection points of the image data for calibrations. The points to be calibrated, described in the first embodiment, correspond to the vertexes or intersection points of the image data for calibration 241 formed of four identical squares or those of the image data for calibration 242 formed of a hexagon having six triangles.

Third Embodiment

Figure 12:
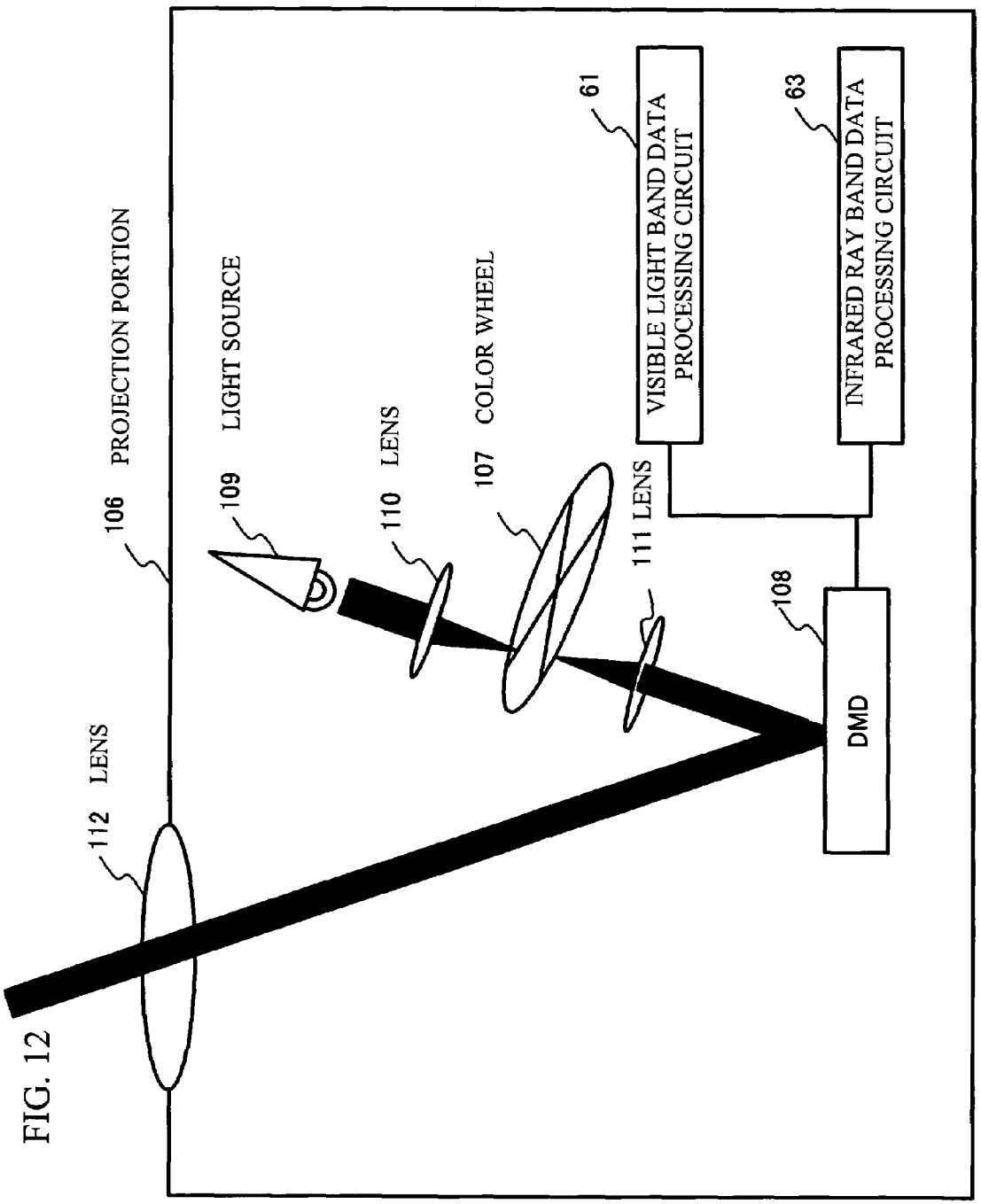
FIG. 12 is a view showing an example of the projection unit having the color wheel in accordance with an embodiment of the present invention.

A description will be given of a third embodiment of the present invention. In the third embodiment, a color wheel is employed for an optical system. FIG. 12 is a view showing a projection unit 106, in which the projection unit 6 includes a color wheel. The projection unit 106 projects the image data for calibration and the projection image data in an identical optical system, whereas the image data for calibration is projected with the infrared lights and the projection image data is projected with the visible lights.

Figure 11:
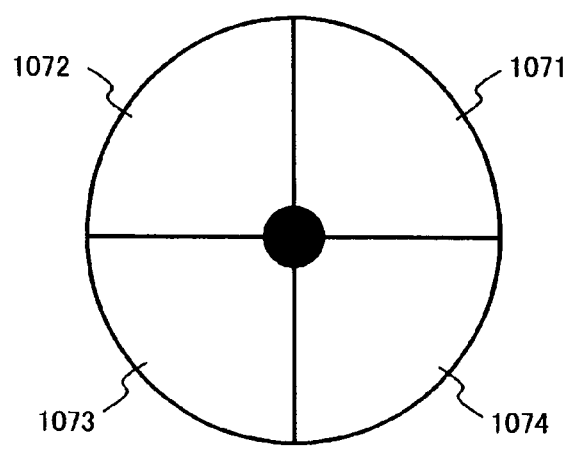
FIG. 11 is a view showing an example of a color wheel in accordance with an embodiment of the present invention.

Specifically, as shown in FIG. 12, the projection unit 106 includes the visible light band data processing circuit 61, the infrared ray band data processing circuit 63, a color wheel 107, a DMD (Digital Micro mirror Device) 108, a light source 109, lenses for combination circuit 110 and 111, and a lens 112. FIG. 11 is a view showing an example of the color wheel 107. As shown in FIG. 11, the color wheel 107 is composed of a filter that corresponds to a range of wavelengths of the visible lights and those of the infrared lights. Specifically, the color wheel 107 includes a red band-pass filter 1071, a green band-pass filter 1072, a blue band-pass filter 1073, and an infrared ray band-pass filter 1074.

The light source 109 emits both the visible lights and the infrared lights. The visible light band light emitting circuit 62 and the infrared ray band light emitting circuit 64, shown in FIG. 3, are realized to share the same light source 109. The combination circuit 65 shown in FIG. 3 is realized with the color wheel 107 and the DMD 108. The output circuit 66 is realized with the lens 112. The lens for combination circuit 110 emits the visible lights and the infrared lights provided from the light source 109 to the color wheel 107 appropriately. The lens for combination circuit 111 makes the visible lights and the infrared lights that have passed through the color wheel 107 enter the DMD 108 appropriately.

The visible light band data processing circuit 61 and the infrared ray band data processing circuit 63 controls the DMD 108 in synchronization with the rotation of the color wheel 107. This makes it possible to project any arbitrary visible lights from the projection unit 106 through the lens 112. In addition, it is possible to create the image data for calibration appropriately with the infrared lights and then to project the image data for projection in the projection area of the screen 13 through the lens 112. The projection unit 106 is composed of the color wheel or the like, as described, and includes an optical system that projects the given image data and the image data for calibration via an identical optical path, which starts from the light source 109 to the lens 112, making it possible to form a small-sized projection unit 106.

Figure 13:
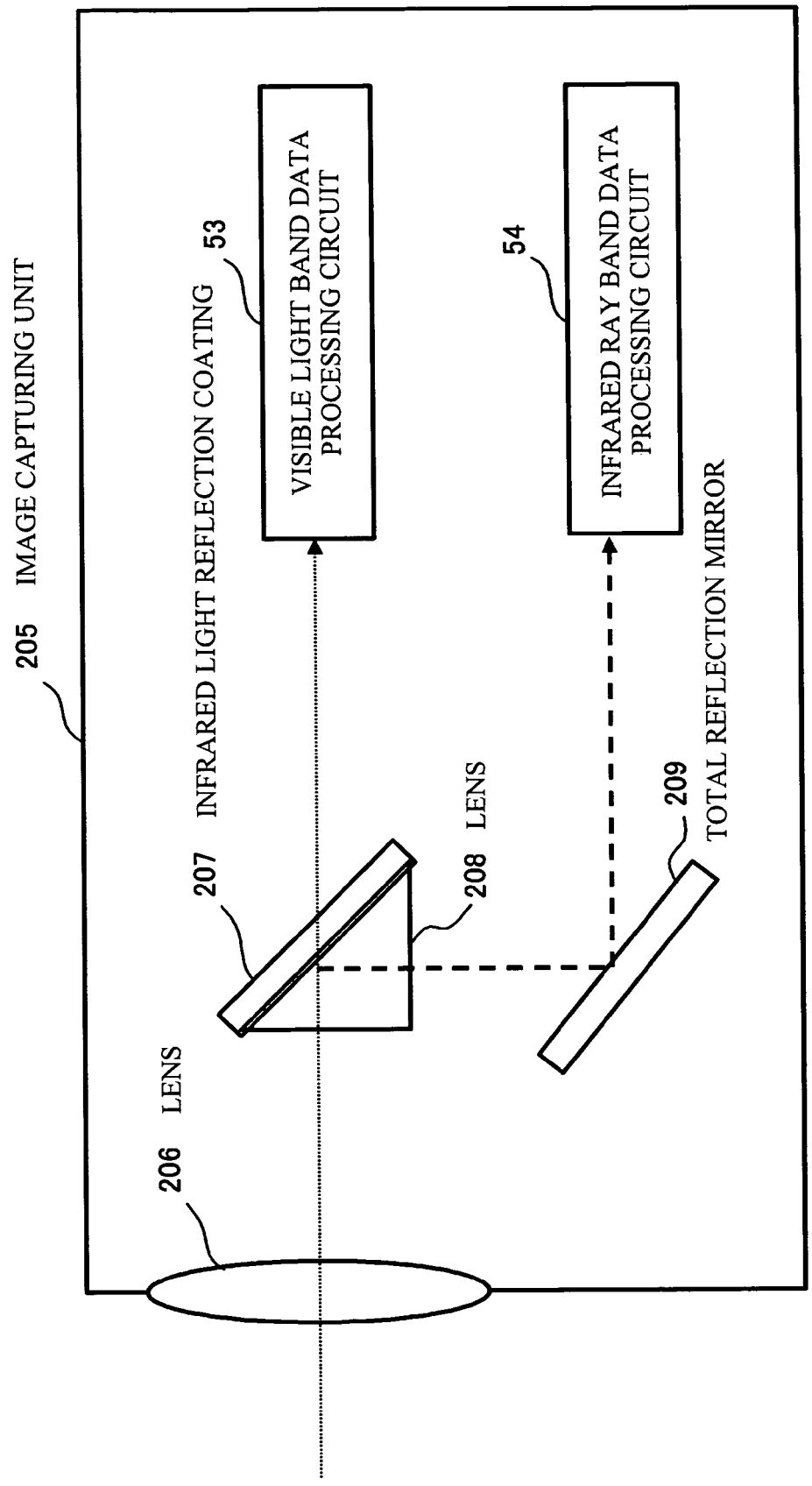
FIG. 13 is a view showing an example of the image data capturing unit in accordance with an embodiment of the present invention.

A description will now be given of the image data capturing unit in accordance with the present embodiment of the present invention. FIG. 13 is a view showing an example of the image data capturing unit in accordance with the present embodiment of the present invention. Referring to FIG. 13, an image data capturing unit 205 includes the visible light band data processing circuit 53, the infrared ray band data processing circuit 54, a lens 206, an infrared light reflection coating 207, a prism 208, and a total reflection mirror 209. Here, the infrared light reflection coating 207, the prism 208, and the total reflection mirror 209 correspond to the filter circuit 52 shown in FIG. 2. The lens 206 corresponds to the optical receiver circuit 51. The visible light band data processing circuit 53 is composed of a device such as a CCD, a memory, and a CPU that controls the device and memory. The visible lights are captured by the CCD, and the data of the visible lights is digitalized and stored in the memory. The infrared ray band data processing circuit 54 is also composed of a device such as a CCD, a memory, and a CPU that controls the device and memory. The infrared lights are captured by the CCD, and the data of the infrared lights is digitalized and stored in the memory. As shown in FIG. 13, the image data capturing unit 205 includes an optical system, made up with the lens 206 through the prism 208, which is identical to an initial stage of the optical path provided for capturing the given image data and the image data for calibration. This enables a small-sized image data capturing unit 205.

The projection image data projected by the projection unit 106 in FIG. 12 is input into the image data capturing unit 205 from the lens 206. The infrared lights pass through the prism 208, are reflected by the infrared light reflection coating 207, and are input into the infrared ray band data processing circuit 54 via the total reflection mirror 209. The visual lights pass through the prism 208 and the infrared light reflection coating 207, and are input into the visible light band data processing circuit 53.

Figure 14:
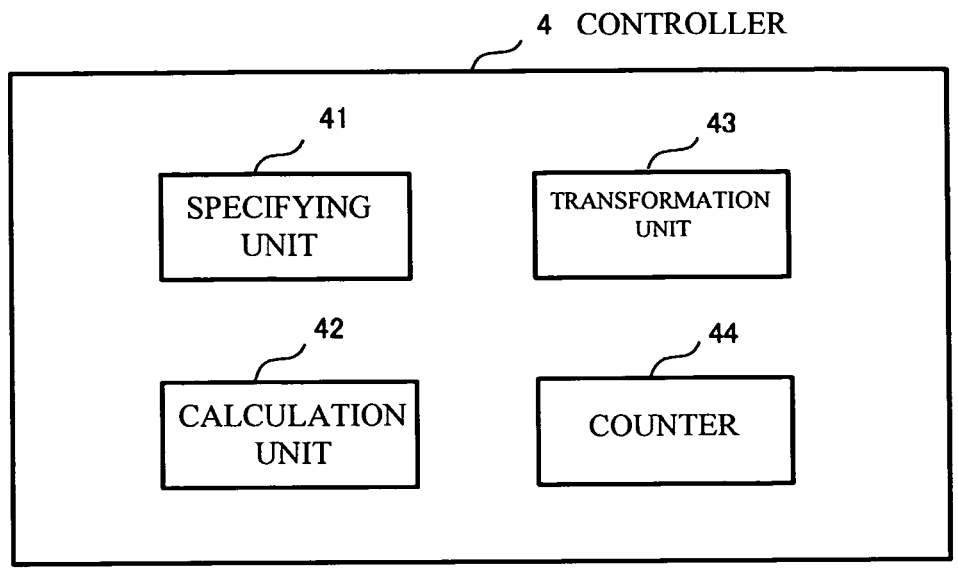
FIG. 14 is a view showing an example of a controller in accordance with an embodiment of the present invention.
Figure 15:
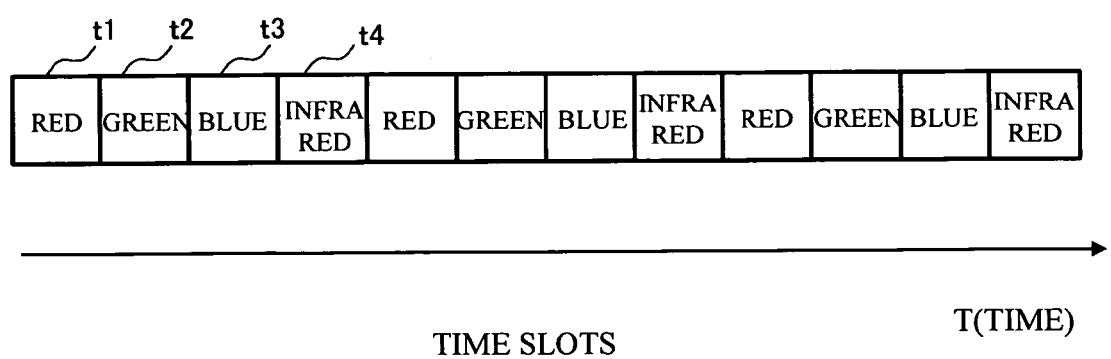
FIG. 15 is a timeline chart showing an example of time slots that controls the color wheel.

Next, a description will be given of how the controller 4 controls the color wheel 107. FIG. 14 is a view showing an example of the controller 4 shown in FIG. 1. As shown in FIG. 14, the controller 4 includes a CPU 401, a memory 402, a timer 403, and a counter 404. FIG. 15 is a timeline chart showing an example of time slots that are used to control the color wheel 107. The color wheel 107 generally rotates around a rotation axis at a constant speed. Time slots t1 through t4 are repeated in a certain period of time. The light emitted from the light source 109 passes through the red band-pass filter 1071 in the time slot t1, passes through the green band-pass filter 1072 in the time slot t2, passes through the blue band-pass filter 1073 in the time slot t3, and passes through the infrared ray band-pass filter 1074 in the time slot t4.

The CPU 401 controls the rotation speed of the color wheel 107 so that the color wheel 107 should follow the time slots shown in FIG. 15. Here, the CPU 401 is able to use the timer 403 or the counter 404 of the controller 4 to measure the time slot to be controlled.

In this manner, the controller 4 controls, manages, or monitors the timer or clock, on a time basis or on a clock basis, every time slice or every time slot, and projects the given image data and the image data for calibration alternately or projects the both of image data successively and repeatedly. Accordingly, it is possible to control to project the image data for calibration with the infrared lights while the projection unit 106 is not projecting the given image data. This makes it possible to exclusively control the time for projecting the given image data and the time for projecting the image data for calibration.

Fourth Embodiment

Figure 16:
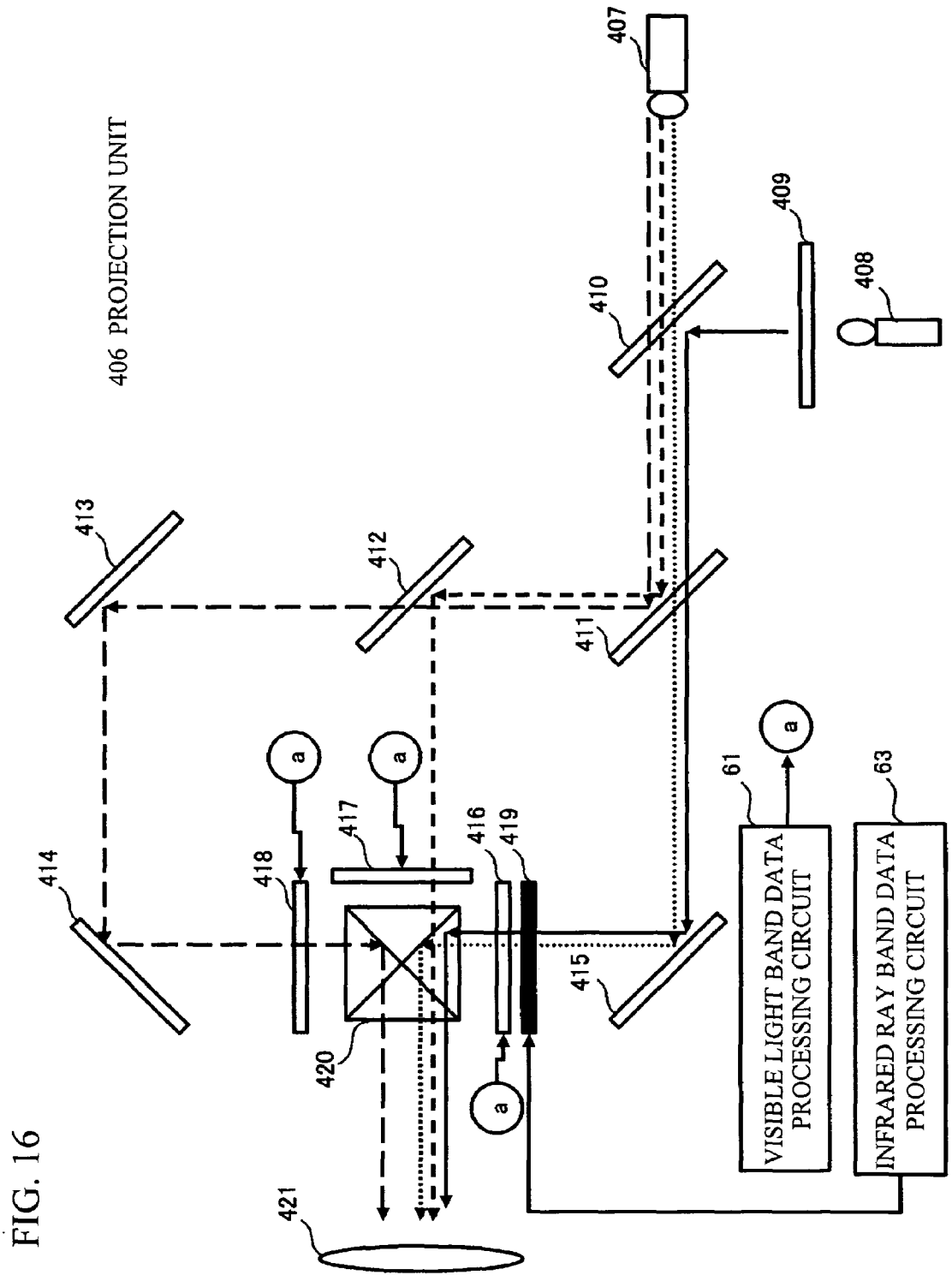
FIG. 16 is a view showing an example of the projection unit having a dichroic mirror in accordance with an embodiment of the present invention.

Now, a description will be given of a fourth embodiment. In accordance with the fourth embodiment of the present invention, the projection unit includes a dichroic mirror. FIG. 16 is a view illustrating the projection unit made up with the dichroic mirror. In the projection unit 106 in accordance with the present embodiment of the present invention, the optical system includes at least an infrared ray band-pass filter, a visible light band-pass crystal liquid panel, a dichroic mirror, and a dichroic prism to be arranged in given positions. As shown in FIG. 16, a projection unit 406 includes light sources 407 and 408, an infrared ray band-pass filter 409, dichroic mirrors 410, 411, and 412, total reflection mirrors 413, 414, and 415, a red band-pass crystal liquid panel 416, a green band-pass crystal liquid panel 417, a blue band-pass crystal liquid panel 418, an infrared ray band-pass crystal liquid panel 419, a dichroic prism 420, and a lens 421.

Here, the dichroic mirror 410 makes the lights in a visible light area pass through, yet reflects the infrared lights. The dichroic mirror 411 makes the lights in a red band and the infrared lights pass through, yet reflects the lights in green and blue bands. The dichroic mirror 412 makes the lights in the blue band, yet reflects the lights in the green band. The red band-pass crystal liquid panel 416 controls the lights in the redband. The greenband-pass crystal liquid panel 417 controls the lights in the green band. The blue band-pass crystal liquid panel 418 controls the lights in the blue band. The infrared ray band-pass crystal liquid panel 419 controls the infrared lights.

The light in the red band emitted from the light source 407 passes through the dichroic mirror 410 and the dichroic mirror 411, and is reflected by the total reflection mirror 415. Then, the light passes through the infrared ray band-pass crystal liquid panel 419, and is controlled by the red band-pass crystal liquid panel 416. Then, the light passes through the dichroic prism 420 and the lens 421, and is projected by the projection unit 406. The light in the green band emitted from the light source 407 passed through the dichroic mirror 410, and is reflected by the dichroic mirrors 411 and 412, and is controlled by the green band-pass crystal liquid panel 417. The light passes through the dichroic prism 420 and the lens 421, and is projected from the projection unit 406.

The light in the blue band emitted from the light source 407 passes through the dichroic mirror 410, is reflected by the dichroic mirror 411, and passes through the dichroic mirror 412. Then, the light is reflected by the total reflection mirror 413 and the total reflection mirror 414, and is controlled by the blue band-pass crystal liquid panel 418, passes through the dichroic prism 420 and the lens 421, and is projected by the projection unit 406.

The infrared light emitted from the light source 408 passes through the infrared ray band-pass filter 409, is reflected by the dichroic mirror 410, and then passes through the dichroic mirror 411. The light is reflected by the total reflection mirror 415, is controlled by the infrared ray band-pass crystal liquid panel 419, and passes through the red band-pass crystal liquid panel 416 and the dichroic prism 420. The light then passes through the lens 421, and the image data for calibration is projected from the projection unit 406. The visible light band data processing circuit 61 is connected to the red band-pass crystal liquid panel 416, the green band-pass crystal liquid panel 417, and the blue band-pass crystal liquid panel 418, and controls the respective crystal liquid panels. The infrared ray band data processing circuit 63 is connected to the infrared ray band-pass crystal liquid panel 419, and controls the infrared ray band-pass crystal liquid panel 419. In this manner, the projection unit 406 includes the optical system in which the given image data and the image data for calibration are projected via the identical optical path, which starts from the dichroic mirror 410 and passes the total reflection mirror 415 and the lens 421, enabling to form a small-sized projection unit 406.

Figure 17:
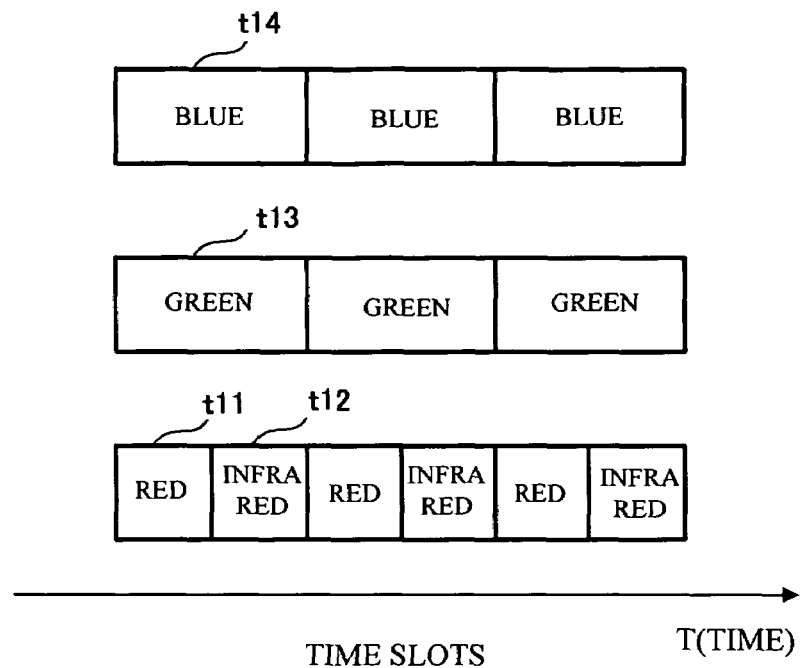
FIG. 17 is a timeline chart showing an example of the time slots that is used to control a crystal liquid panel.

FIG. 17 is a timeline chart showing an example of the time slots that are used to control the crystal liquid panels in accordance with the fourth embodiment of the present invention. Referring to FIG. 17, a certain period of time is divided into a time slot t11 for the red band data, a time slot t12 for the infrared ray band data, a time slot t13 for the green band data, and a time slot t14 for the blue band data. The time slot t11 for the red band data and the time slot t12 for the infrared ray band data are alternately repeated.

The controller 4 controls the visible light band data processing circuit 61 and the infrared ray band data processing circuit 63 at the timings of the time slot t11, the time slot t12, the time slot t13, and the time slot t14. It is possible to synchronize a start point of the time slot t11, that of the time slot t13, and that of the time slot t14.

The visible light band data processing circuit 61 controls the red band-pass crystal liquid panel 416 in the time slot t11 to control the lights in the red band. The infrared ray band data processing circuit 63 controls the infrared ray band-pass crystal liquid panel 419 in the time slot t11 so that all the lights are able to pass. The infrared ray band data processing circuit 63 controls the infrared ray band-pass crystal liquid panel 419 in the time slot t12 to control the infrared lights. The visible light band data processing circuit 61 controls the red band-pass crystal liquid panel 416 in the time slot t12 so that all the lights are able to pass. This makes it possible to project the image data for calibration with the infrared lights. The visible light band data processing circuit 61 controls the green band-pass crystal liquid panel 417 in time slot t13 to control the lights in the green band. The visible light band data processing circuit 61 controls the blue band-pass crystal liquid panel 418 in time slot t14 to control the lights in the blue band. In this manner, the time is shard so that the projection unit 406 projects the image data for calibration while the given image data is not being projected. It is therefore possible to exclusively control the time for projecting the given image data and the time for projecting the image data for calibration.

Fifth Embodiment

A fifth embodiment of the present invention will be described now. In the above-mentioned embodiments, the description has been given of the examples of projecting the image data for calibration with the infrared lights. In the present embodiment, a description will be given of an example of projecting the image data for calibration with the lights other than the infrared lights. Here, when the image data for calibration is sent and projected with the lights other than the infrared lights, it is possible to utilize the configurations, components, and methods described above, except those relating to the infrared rays. Hereinafter, in the fifth embodiment, the same components and configurations as those of the first through fourth embodiments have the same reference numerals and a detailed explanation will be omitted. Also, in the present embodiment, the calibration parameters collectively denotes data for calibrating the position, scaling up and down, rotation, and trapezoidal distortion.

Figure 18:
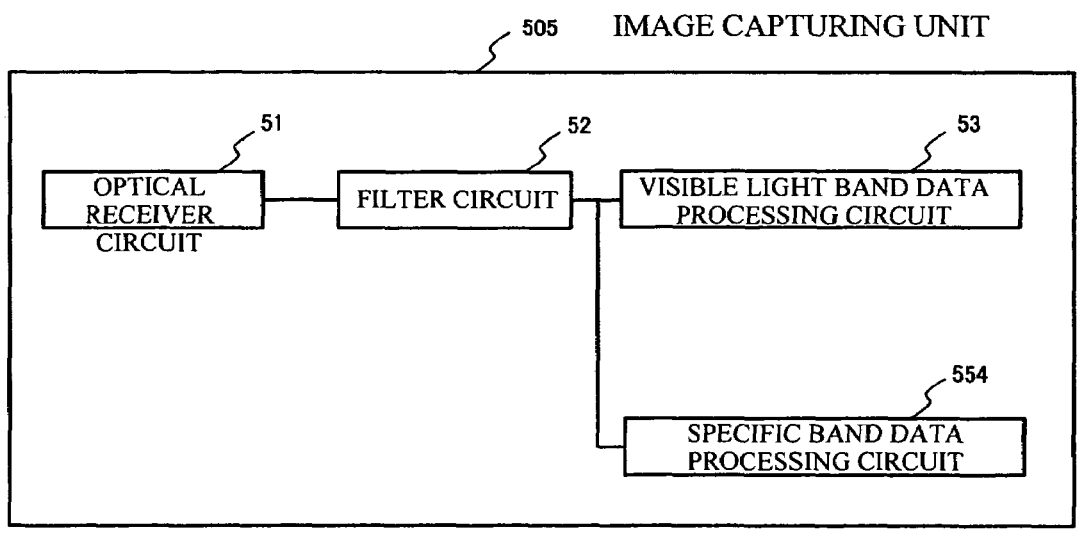
FIG. 18 is a view showing an example of the image data capturing unit in accordance with a fifth embodiment of the present invention.

FIG. 18 is a view showing an example of an image data capturing unit 505 in accordance with the fifth embodiment of the present invention. Referring to FIG. 18, the image data capturing unit 505 includes the optical receiver circuit 51, the filter circuit 52, the visible light band data processing circuit 53, and a specific band data processing circuit 554. The image data capturing unit 505 is different from the image data capturing unit 5 described in the first embodiment in that the specific band data processing circuit 554 is included.

The specific band data processing circuit 554 processes electromagnetic waves or lights in the bands other than the band of infrared rays. Here, the filter circuit 52 separates the visible lights and the electromagnetic waves or lights other than the band of infrared lights, outputs such separated visible lights to the visible light band data processing circuit 53, and outputs the electromagnetic waves or lights other than the band of infrared lights, to the specific band data processing circuit 554. The specific band data processing circuit 554 photoelectrically converts the visible lights and the electromagnetic waves or lights other than the band of infrared lights, which are output from the filter circuit 52, and retains such converted data in the internal memory thereof.

Figure 19:
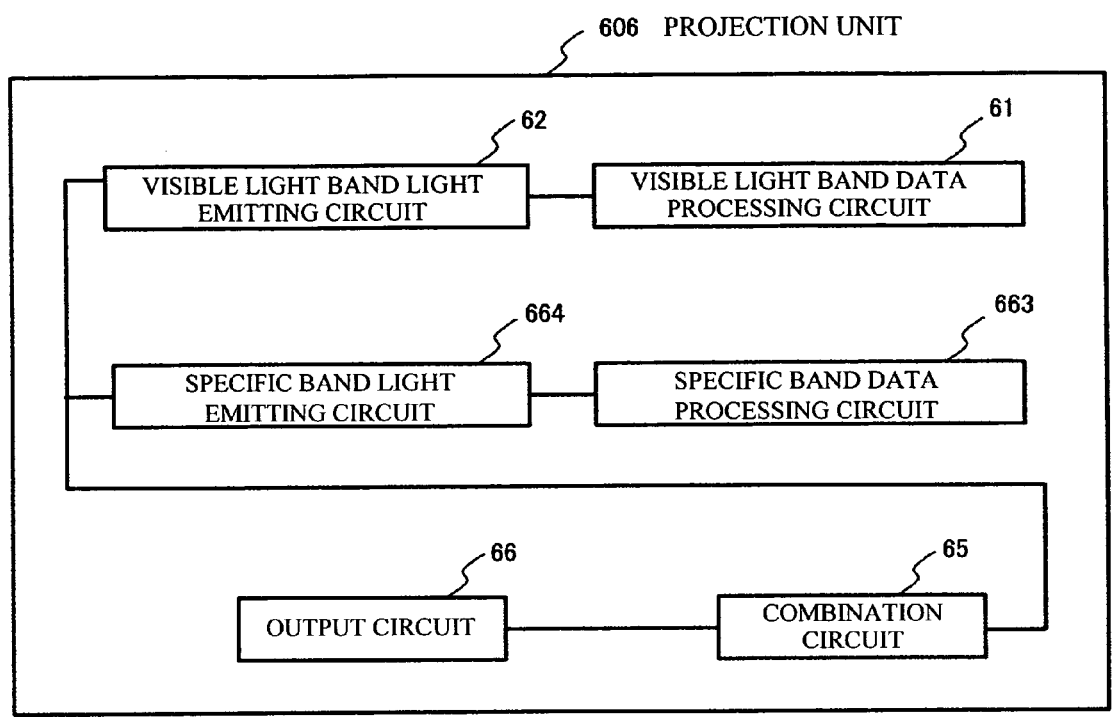
FIG. 19 is a view showing an example of the projection unit in accordance with the fifth embodiment of the present invention.

FIG. 19 is a view showing an example of the projection unit in accordance with the fifth embodiment of the present invention. Referring to FIG. 19, a projection unit 606 includes the visible light band data processing circuit 61, the visible light band light emitting circuit 62, a specific band data processing circuit 663, a specific band light emitting circuit 664, the combination circuit 65, and the output circuit 66. The projection unit 606 is different from the projection unit 6 described in the first embodiment in that the specific band data processing circuit 663 and the specific band light emitting circuit 664 are included.

The specific band data processing circuit 663 creates the image data for calibration to be output as the electromagnetic waves in the band other than the infrared lights, and outputs the image data for calibration to the specific band light emitting circuit 664 provided as a subsequent circuit. The specific band data processing circuit 663 inputs the data of the image for calibration, which has been input from the specific band light emitting circuit 664, emits the electromagnetic waves or lights in the band other than the infrared lights according to the data of the image for calibration, and sends such emitted lights or electromagnetic waves to the combination circuit 65.

Figure 20:
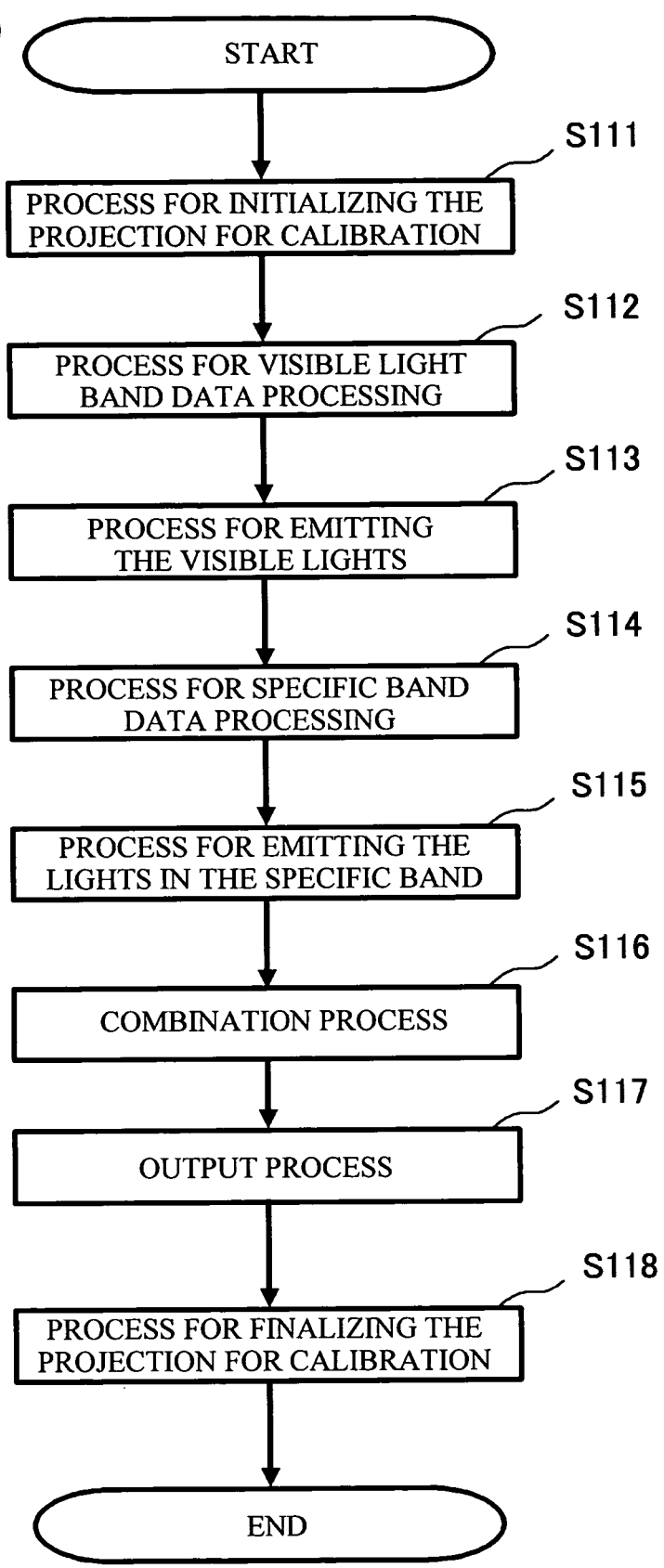
FIG. 20 is a flowchart showing a process for projection for calibration implemented in step S2 in accordance with the fifth embodiment of the present invention.

FIG. 20 is a flowchart showing a process for projection for calibration in accordance with the fifth embodiment of the present invention. FIG. 20 shows the process implemented in step S2 shown in FIG. 4 in detail. As shown, the projection process for calibration in accordance with the fifth embodiment of the present invention includes a process for initializing the projection for calibration in step S111, a process for visible light band data processing in step S112, a process for emitting the visible lights in step S113, a process for specific band data processing in step S114, a process for emitting the lights in the specific band in S115, a combination process in step S116, an output process in S117, and a process for finalizing the projection for calibration in step S118. The example in accordance with the present embodiment is different from other embodiments in that the process for specific band data processing in step S114 and the process for emitting the lights in the specific band in S115 are included.

In step S114, the projection unit 606 creates the data of the image for calibration to be output from the specific band data processing circuit 663 in the projection unit 606 as the electromagnetic waves other than the infrared rays. Then, the data of the image for calibration is output into the specific band light emitting circuit 664 provided in the subsequent circuit. Subsequently, in step S115, the data of projection for calibration is input into the specific band light emitting circuit 664 from the specific band data processing circuit 663, emits the electromagnetic waves or lights other than the band of the infrared lights, and sends the emitted electromagnetic waves or lights to the combination circuit 65.

Figure 21:
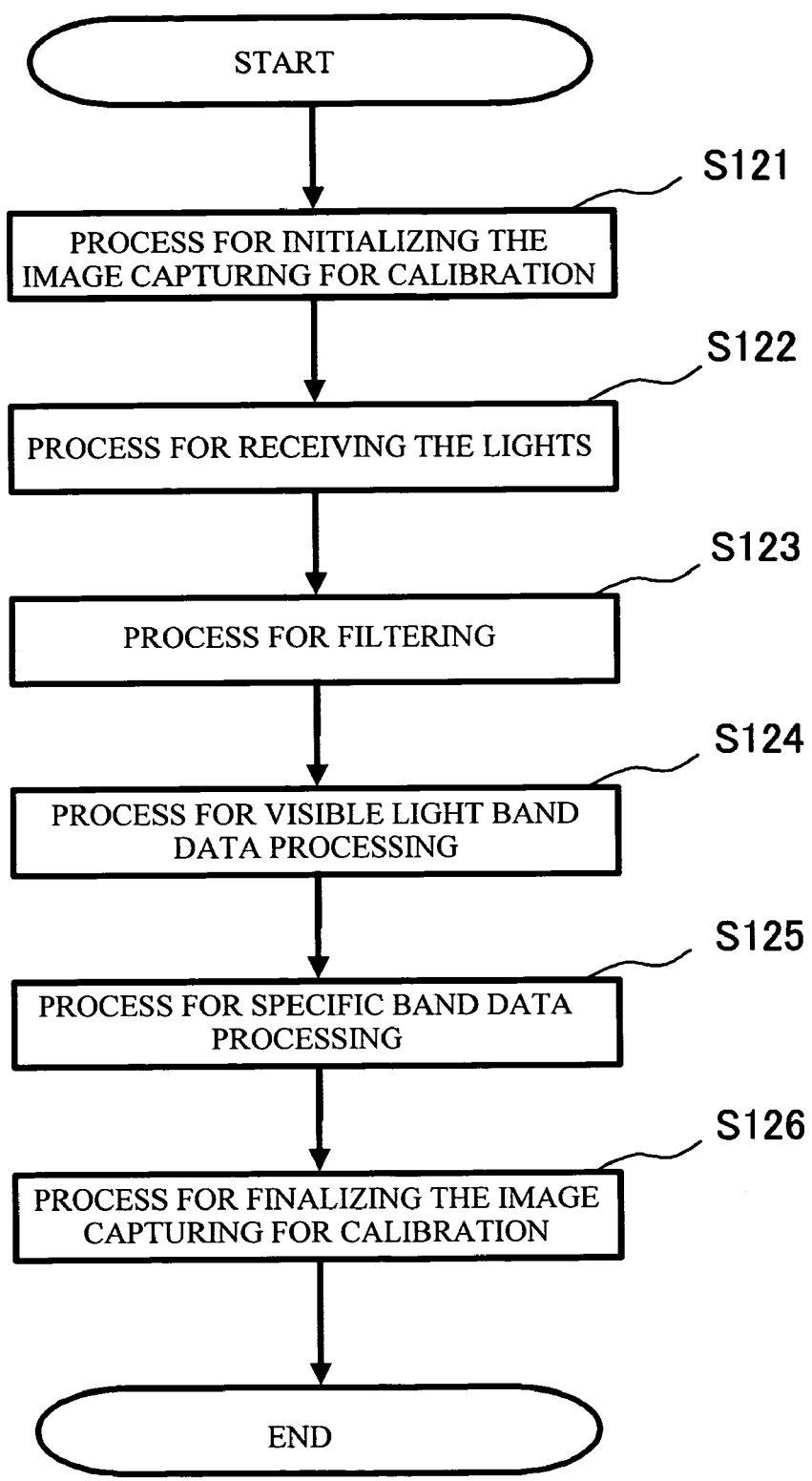
FIG. 21 is a flowchart showing a process for image data capturing for calibration implemented in step S2 in accordance with the fifth embodiment of the present invention.

FIG. 21 is a flowchart showing the process for projection for calibration in accordance with the fifth embodiment of the present invention. FIG. 21 is the flowchart showing step S3 in accordance with the fifth embodiment in detail. As shown, the image data capturing process for calibration in accordance with the fifth embodiment implemented in step S3 includes a process for initializing the image data capturing for calibration in step S121, a process for receiving the lights in step S122, a process for filtering in step S123, a process for visible light band data processing in step S124, a process for specific band data processing in step S125, and a process for finalizing the image data capturing for calibration in step S126. In step S125, the specific band data processing circuit 554 photoelectrically converts the electromagnetic waves or lights in a specific band other than the band of infrared rays, which are output from the filter circuit 52, extracts the data of the image for calibration, and outputs the data of the image for calibration to the internal memory of the controller 4.

In this manner, it is possible to send the data of the image for calibration with the electromagnetic waves and lights in the band other than the infrared lights. It is also possible to use the electromagnetic waves in the band other than the visible lights. In addition, the visible lights in the specific band may be used as the light in the band other than the electromagnetic waves or light other than the infrared lights. When the data of the image for calibration is sent with the visible lights in the specific band, it is possible to selectively use the visible lights in the band not being used for projecting the given image data by the user so as to project the image data for calibration.

On the information processing system in the above-mentioned aspect, the calculation unit implements a process for calculating the parameters at a given time interval. The projection area and the captured area can be aligned in real time. This enables a dynamic calibration, even if the projection area and the captured area are changing momentarily. It is therefore easily possible to calibrate the projection area and the captured area.

On the information processing system in the above-mentioned aspect, the projection unit may project the image data for calibration with infrared light. The image data for calibration is operated with the infrared lights, making it possible to automatically calibrate the misalignment of the projection area and the captured are, and the problem caused by the distortion due to scaling up or down or the distortion due to parallel displacement and rotation, without letting the notice the image data for calibration.

On the information processing system in the above-mentioned aspect, the optical system may include a color wheel. The given image data and the image data for calibration are superimposed by the color wheel. It is possible to control the optical system in terms of time, with time slots. In addition, the apparatus, component, device, element, and chassis for housing them can be formed relatively small, as compared to the conventional technique.

The information processing system in the above-mentioned aspect may further include a sending unit that sends the image data captured to a remote site, after the information is transformed by the transformation unit and a receiving unit that receives the projection image data projected by the projection unit from the remote site. The projection unit may implement a projection process according to the image data received by the receiving unit. In this manner, it is possible to provide the iLight system.

A storage medium which is readable by a computer may include information in order to execute a process of information processing on a computer and the function of the storage medium including capturing image data in which projection image data for calibration is captured, specifying positions of points to be calibrated with the image data captured, the positions of the points to be calibrated representing a shape of the image data for calibration, calculating parameters to transform the positions of the points to be calibrated on to the positions of reference points, and transforming the captured image data with the parameters. In addition, the control method of the present invention is realized in the server system. The extraction unit of the image data capturing unit is composed by the filter circuit 52 and the infrared ray band data processing circuit 54.

An information analysis method of the present invention is realized with a CPU (Central Processing Unit), ROM (Read Only Memory), RAM (Random Access Memory), or the like, by installing a program from a portable memory device or a storage device such as a hard disc device, CD-ROM, DVD, or a flexible disc or downloading the program through a communications line. Then the steps of program are executed as the CPU operates the program.

An information processing system may include a projection unit 6 that projects at least image data for calibration, an image data capturing unit 5 that captures projection image data projected by the projection unit 6, the specifying unit 41 that specifies positions of points to be calibrated with the image data captured by the image data capturing unit, the positions of the points to be calibrated representing a shape of the image data for calibration, the calculation unit 42 that calculates parameters to transform the positions of the points to be calibrated on to the positions of reference points and a moving unit, not shown, that moves at least one of the image data capturing unit 5 and the projection unit 6. In the above-described embodiments, the captured image data captured by the image data capturing unit 5 is transformed, yet by moving the image data capturing unit 5 and the projection unit 6 with the parameters, it is possible to calibrate the captured area to be captured by the image data capturing unit 5 and the projection area to be projected by the projection unit 6, so as to obtain the same effect.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-189033 filed on Jun. 28, 2005 including specification, claims, drawings, and abstract is incorporated herein by reference in its entirety.

What is claimed is:

1. An information processing system comprising:
 a projection unit that projects at least image data for calibration;
 an image data capturing unit that captures projection image data projected by the projection unit;
 a specifying unit that specifies positions of points to be calibrated with the image data captured by the image data capturing unit, the positions of the points to be calibrated representing a shape of the image data for calibration;
 a calculation unit that calculates parameters to transform the positions of the points to be calibrated on to the positions of reference points; and
 a transformation unit that transforms the image data captured by the image data capturing unit with the parameters.

2. The information processing system as claimed in claim 1, wherein the calculation unit calculates a slope and an intercept of a regression line in a regression analysis method, with the positions of the points to be calibrated and the positions of the reference points, and the parameters are calculated with the slope and the intercept of the regression line.

3. The information processing system as claimed in claim 1, wherein the calculation unit calculates a slope and
 an intercept of a regression line in a regression analysis method, with the positions of the points to be calibrated and the positions of reference points, and the parameters are described in a structured document in which the intercept of the regression line denotes positional data of the reference points in a Cartesian coordinate system and the slope of the regression line denotes a scaling coefficient in both horizontal and vertical direction.

4. The information processing system as claimed in claim 1, wherein the calculation unit implements a process for calculating the parameters at a given timing.

5. The information processing system as claimed in claim 1, wherein the calculation unit implements a process for calculating the parameters at a given time interval.

6. The information processing system as claimed in claim 1, wherein the projection unit projects the image data for calibration with infrared light.

7. The information processing system as claimed in claim 1, wherein the projection unit projects the image data for projection having a shape in which at least one of a point, a line, a triangle, or a rectangle is combined.

8. The information processing system as claimed in claim 1, wherein the projection unit includes an optical system that projects given image data and image data for calibration.

9. The information processing system as claimed in claim 1, wherein the projection unit includes an optical system in which given image data and image data for calibration are projected after passing through an identical optical path.

10. The information processing system as claimed in claim 8, wherein the image data for calibration is projected while the given image data is not being projected.

11. The information processing system as claimed in claim 8, wherein the optical system includes a color wheel.

12. The information processing system as claimed in claim 8, wherein the optical system includes a color wheel formed of filters that correspond to visible wavelength bands and an infrared light wavelength band.

13. The information processing system as claimed in claim 8, wherein the optical system includes at least an infrared ray pass-band filter, a crystal liquid panel for a visible light band, a dichroic mirror, and a dichroic prism to be provided in given places.

14. The information processing system as claimed in claim 1, wherein the image data capturing unit includes an extraction unit that extracts the image data for calibration with the information of the projection image data projected by the projection unit.

15. The information processing system as claimed in claim 1, wherein the image data capturing unit includes an optical system in which an initial stage of an optical path is shared by given image data and image data for calibration.

16. The information processing system as claimed in claim 1, further comprising;
 a sending unit that sends the image data captured to a remote site, after the information is transformed by the transformation unit; and
 a receiving unit that receives the projection image data projected by the projection unit from the remote site,
 wherein the projection unit implements a projection process according to the image data received by the receiving unit.

17. An information processing apparatus comprising:
 a specifying unit that specifies positions of points to be calibrated with image data projected by a projection unit and captured by an image data capturing unit, the positions of the points to be calibrated representing a shape of the image data for calibration;
 a calculation unit that calculates parameters to transform the positions of the points to be calibrated on to the positions of reference points; and
 a transformation unit that transforms the image data captured by the image data capturing unit with the parameters.

18. An information processing method comprising:
 projecting at least image data for calibration;
 capturing projection image data projected by the projection unit;
 specifying positions of points to be calibrated with the image data captured by an image data capturing unit, the positions of the points to be calibrated representing a shape of the image data for calibration;

calculating parameters to transform the positions of the points to be calibrated on to the positions of reference points; and transforming the image data captured by the image data capturing unit with the parameters.

19. The information processing method as claimed in claim 18, wherein a slope and an intercept of a regression line are calculated in a regression analysis method, with the positions of the points to be calibrated and the positions of the reference points, and the parameters are calculated with the slope and the intercept of the regression line.

20. The information processing method as claimed in claim 18, wherein a slope and an intercept of a regression line are calculated in a regression analysis method, with the positions of the points to be calibrated and the positions of reference points, and the parameters are described in a structured document in which the intercept of the regression line denotes positional data of the reference points in a Cartesian coordinate system and the slope of the regression line denotes a scaling coefficient in both horizontal and vertical direction.

21. The information processing method as claimed in claim 18, wherein the projection unit projects the image data for calibration with infrared light.

22. The information processing method as claimed in claim 18, further comprising:

sending the image data captured to a remote site, after the information is transformed by the transformation unit; and receiving the projection image data projected by the projection unit from the remote site; and implementing a projection process according to the image data received by the receiving unit.

23. A storage medium which is readable by a computer in order to execute a process of information processing on a computer and the function of the storage medium comprising:

capturing image data in which projection image data for calibration is captured;

specifying positions of points to be calibrated with the image data captured, the positions of the points to be calibrated representing a shape of the image data for calibration;

calculating parameters to transform the positions of the points to be calibrated on to the positions of reference points; and transforming the captured image data with the parameters.

24. The storage medium as claimed in claim 23, wherein a slope and an intercept of a regression line are calculated in a regression analysis method, with the positions of the points to be calibrated and the positions of the reference points, and the parameters are calculated with the slope and the intercept of the regression line.

25. The storage medium as claimed in claim 23, wherein a slope and an intercept of a regression line are calculated in a regression analysis method, with the positions of the points to be calibrated and the positions of reference points, and the parameters are described in a structured document in which the intercept of the regression line denotes positional data of the reference points in a Cartesian coordinate system and the slope of the regression line denotes a scaling coefficient in both horizontal and vertical direction.

* * * * *